US011477758B2

(12) United States Patent
Choi et al.

(10) Patent No.: US 11,477,758 B2
(45) Date of Patent: Oct. 18, 2022

(54) TECHNIQUES FOR DETERMINING POSITION OVER SIDELINK USING MULTIPLE ANTENNAS

(71) Applicant: QUALCOMM Incorporated, San Diego, CA (US)

(72) Inventors: Chang-Sik Choi, Seoul (KR); Shuanshuan Wu, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 17/334,146

(22) Filed: May 28, 2021

(65) Prior Publication Data

US 2022/0007327 A1 Jan. 6, 2022

Related U.S. Application Data

(60) Provisional application No. 63/047,649, filed on Jul. 2, 2020.

(51) Int. Cl.
*H04W 92/18* (2009.01)
*H04W 64/00* (2009.01)
*H04L 5/00* (2006.01)

(52) U.S. Cl.
CPC ......... *H04W 64/006* (2013.01); *H04L 5/0051* (2013.01); *H04W 92/18* (2013.01)

(58) Field of Classification Search
CPC ... H04W 64/00; H04W 64/006; H04W 92/18; H04W 16/14; H04W 76/14; H04L 5/0048; H04L 5/0051; H04L 5/0053; H04B 7/06; G01S 13/765; G01S 5/0221; G01S 5/0289
See application file for complete search history.

(56) References Cited

U.S. PATENT DOCUMENTS

2019/0200339 A1* 6/2019 Handte ............... H04W 72/048
2019/0230618 A1* 7/2019 Saur .......................... G01S 5/14
2019/0239181 A1* 8/2019 Gangakhedkar ...... H04W 76/10
(Continued)

FOREIGN PATENT DOCUMENTS

WO WO-2019133495 A1 7/2019
WO WO-2019158223 A1 8/2019

OTHER PUBLICATIONS

Partial International Search Report—PCT/US2021/035188—ISA/EPO—dated Sep. 16, 2021.
(Continued)

*Primary Examiner* — Siu M Lee
(74) *Attorney, Agent, or Firm* — Satheesh Karra

(57) ABSTRACT

Methods, systems, and devices for wireless communications are described. A first user equipment (UE) may receive, using a set of receive antennas, a first positioning reference signal (PRS). The first UE may transmit, using a set of transmit antennas in response to the received first PRS, a second PRS. The first UE may receive, from a second UE, a control message indicating time and position information for the first PRS transmitted by the second UE and for the second PRS received at the second UE. The first UE may determine a position of the first UE based on the received control message and composite time and position information for the first PRS received at the first UE and for the second PRS transmitted by the first UE.

30 Claims, 11 Drawing Sheets

(56) References Cited

U.S. PATENT DOCUMENTS

| | | | |
|---|---|---|---|
| 2021/0136527 A1* | 5/2021 | Tadayon | H04L 5/0053 |
| 2022/0146620 A1* | 5/2022 | Alawieh | H04L 5/0051 |
| 2022/0229146 A1* | 7/2022 | Ko | H04L 1/00 |

OTHER PUBLICATIONS

International Search Report and Written Opinion—PCT/US2021/035188—ISA/EPO—dated Nov. 18, 2021.

* cited by examiner

TECHNIQUES FOR DETERMINING POSITION OVER SIDELINK USING MULTIPLE ANTENNAS

CROSS REFERENCE

The present Application for Patent claims the benefit of U.S. Provisional Patent Application No. 63/047,649 by CHOI et al., entitled "TECHNIQUES FOR DETERMINING POSITION OVER SIDELINK USING MULTIPLE ANTENNAS," filed Jul. 2, 2020, assigned to the assignee hereof, and expressly incorporated by reference herein.

FIELD OF TECHNOLOGY

The following relates generally to wireless communications and more specifically to techniques for determining position over sidelink using multiple antennas.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a wireless device (e.g., a user equipment (UE)) may be configured to determine its own position and/or the position of other wireless devices based on sidelink reference signals (e.g., positioning reference signals (PRSs)) exchanged with the other wireless devices. However, in cases where a UE includes multiple transmit (Tx) antennas and/or multiple receive (Rx) antennas, the transmission times and arrival times of PRSs transmitted and received by the UE will be different for each individual antenna due to the relative location of each respective antenna. Accordingly, these positioning techniques may suffer from ever-increasing complexity and computational cost due to the increasing numbers of antennas being used in UEs.

SUMMARY

The described techniques relate to improved methods, systems, devices, and apparatuses that support techniques for determining position over sidelink using multiple antennas. Generally, the described techniques provide for sidelink positioning with multiple antennas. In particular, user equipments (UEs), such as vehicles, roadside units (RSUs), or both, may exchange positioning reference signals (e.g., positioning reference signals (PRSs)) as part of the sidelink positioning process. The UEs may determine composite (e.g., average, mean) transmission and reception times associated with received PRSs across sets of receive antennas, and composite transmission and reception positions associated with transmitted PRSs across sets of transmit antennas. Composite time and position information may be exchanged via a control message as part of the sidelink positioning process. Subsequently, a UE may determine the position of the UE based on the control messages received from other UEs and the composite time and position information associated with the exchanged PRSs. By determining composite time and position information across the sets of antennas, the UEs may perform sidelink positioning, for example without having to signal and compute individual transmit/receive times and positions for each individual transmit antenna and receive antenna, thereby reducing the computational cost of the sidelink positioning process.

A method of wireless communication at a first UE is described. The method may include receiving, using a set of receive antennas, a first PRS, transmitting, using a set of transmit antennas in response to the received first PRS, a second PRS, the set of transmit antennas or the set of receive antennas, or both, including a set of antennas, receiving, from a second UE, a control message indicating time and position information for the first PRS transmitted by the second UE and for the second PRS received at the second UE, and determining a position of the first UE based on the received control message and composite time and position information for the first PRS received at the first UE and for the second PRS transmitted by the first UE.

An apparatus for wireless communication at a first UE is described. The apparatus may include a processor, memory coupled with the processor, and instructions stored in the memory. The instructions may be executable by the processor to cause the apparatus to receive, using a set of receive antennas, a first PRS, transmit, using a set of transmit antennas in response to the received first PRS, a second PRS, the set of transmit antennas or the set of receive antennas, or both, including a set of antennas, receive, from a second UE, a control message indicating time and position information for the first PRS transmitted by the second UE and for the second PRS received at the second UE, and determine a position of the first UE based on the received control message and composite time and position information for the first PRS received at the first UE and for the second PRS transmitted by the first UE.

Another apparatus for wireless communication at a first UE is described. The apparatus may include means for receiving, using a set of receive antennas, a first PRS, transmitting, using a set of transmit antennas in response to the received first PRS, a second PRS, the set of transmit antennas or the set of receive antennas, or both, including a set of antennas, receiving, from a second UE, a control message indicating time and position information for the first PRS transmitted by the second UE and for the second PRS received at the second UE, and determining a position of the first UE based on the received control message and composite time and position information for the first PRS received at the first UE and for the second PRS transmitted by the first UE.

A non-transitory computer-readable medium storing code for wireless communication at a first UE is described. The code may include instructions executable by a processor to receive, using a set of receive antennas, a first PRS, transmit, using a set of transmit antennas in response to the received first PRS, a second PRS, the set of transmit antennas or the set of receive antennas, or both, including a set of antennas, receive, from a second UE, a control message indicating time and position information for the first PRS transmitted by the second UE and for the second PRS received at the second UE, and determine a position of the first UE based on the received control message and composite time and position information for the first PRS received at the first UE and for the second PRS transmitted by the first UE.

Some examples of the method, apparatuses, and non-transitory computer-readable medium described herein may further include operations, features, means, or instructions for determining a composite reception time and a composite reception position associated with receiving the first PRS across the set of receive antennas, where the composite time and position information may be based on the composite reception time and the composite reception position.

In some examples of the method, apparatuses, and non-transitory computer-readable medium described herein, determining the composite reception time and the composite reception position associated with the receiving first PRS across the set of receive antennas may include operations, features, means, or instructions for determining, for each receive antenna of the set of receive antennas, a time at which the first PRS was received at the receive antenna and a position of the receive antenna, determining an average time, a weighted average time, or an arithmetic mean time for the first PRS, and determining an average position, a weighted average position, or an arithmetic mean position for the set of receive antennas associated with the first PRS.

In some examples of the method, apparatuses, and non-transitory computer-readable medium described herein, the set of receive antennas includes one receive antenna.

In some examples of the method, apparatuses, and non-transitory computer-readable medium described herein, the set of receive antennas includes a set of receive antennas.

Some examples of the method, apparatuses, and non-transitory computer-readable medium described herein may further include operations, features, means, or instructions for determining a composite transmission time and a composite transmission position associated with transmitting the second PRS across the set of transmit antennas, where the composite time and position information may be based on the composite transmission time and the composite transmission position.

In some examples of the method, apparatuses, and non-transitory computer-readable medium described herein, determining the composite transmission time and the composite transmission position associated with transmitting the second PRS across the set of transmit antennas may include operations, features, means, or instructions for determining a set of transmission times indicating a time at which the second PRS was transmitted by each transmit antenna of the set of transmit antennas, determining an average time, a weighted average time, or an arithmetic mean time for the second PRS, and determining an average position, a weighted average position, or an arithmetic mean position for the set of transmit antennas associated with the second PRS.

In some examples of the method, apparatuses, and non-transitory computer-readable medium described herein, the set of transmit antennas includes one transmit antenna.

In some examples of the method, apparatuses, and non-transitory computer-readable medium described herein, the set of transmit antennas includes a set of transmit antennas.

Some examples of the method, apparatuses, and non-transitory computer-readable medium described herein may further include operations, features, means, or instructions for receiving, via the control message, an indication of a position of the second UE, where determining the position of the first UE may be based on the indication of the position of the second UE.

Some examples of the method, apparatuses, and non-transitory computer-readable medium described herein may further include operations, features, means, or instructions for determining a first propagation time associated with the first PRS, a second propagation time associated with the second PRS, or both, based on the received control message and the composite time and position information for the first PRS received at the first UE and for the second PRS transmitted by the first UE, and determining the position of the of the first UE based on the position of the second UE, the first propagation time, the second propagation time, or any combination thereof.

Some examples of the method, apparatuses, and non-transitory computer-readable medium described herein may further include operations, features, means, or instructions for transmitting, to the second UE, a first sidelink transmission including an indication of a first set of resources allocated for the first PRS, a second set of resources allocated for the second PRS, or both.

Some examples of the method, apparatuses, and non-transitory computer-readable medium described herein may further include operations, features, means, or instructions for transmitting, to a third UE, a second sidelink transmission including an indication of a third set of resources allocated for a third PRS, a fourth set of resources allocated for a fourth PRS, or both.

Some examples of the method, apparatuses, and non-transitory computer-readable medium described herein may further include operations, features, means, or instructions for receiving the third PRS from the third UE using the set of receive antennas in response to the second sidelink transmission, transmitting the fourth PRS to the third UE using the set of transmit antennas in response to the received third PRS, and receiving, from the third UE, an additional control message indicating time and position information for the third PRS transmitted by the third UE, and time and position information for the fourth PRS received at the third UE, where determining the position of the first UE may be based on the additional control message received from the third UE.

Some examples of the method, apparatuses, and non-transitory computer-readable medium described herein may further include operations, features, means, or instructions for estimating a clock calibration error associated with the set of receive antennas, the set of transmit antennas, or both, based on the control message received from the second UE, where determining the position of the first UE may be based on the estimated clock calibration error.

In some examples of the method, apparatuses, and non-transitory computer-readable medium described herein, the control message received from the second UE includes an intelligent transportation system message.

In some examples of the method, apparatuses, and non-transitory computer-readable medium described herein, the first PRS, the second PRS, or both, may be transmitted via an unlicensed radio frequency spectrum band, and where the control message may be transmitted via a licensed radio frequency spectrum band.

In some examples of the method, apparatuses, and non-transitory computer-readable medium described herein, the first PRS, the second PRS, the control message, or a combination thereof, may be transmitted via a sidelink communication link between the first UE and the second UE.

In some examples of the method, apparatuses, and non-transitory computer-readable medium described herein, the first UE includes a first vehicle, and where the second UE includes a second vehicle or a roadside unit.

A method of wireless communication at a second UE is described. The method may include transmitting, using a set of transmit antennas, a first PRS, receiving, using a set of receive antennas in response to the transmitted first PRS, a second PRS, the set of transmit antennas, the set of receive antennas, or both, including a set of antennas, and transmitting, to a first UE, a control message indicating composite time and position information for the first PRS transmitted using the set of transmit antennas and for the second PRS received using the set of receive antennas.

An apparatus for wireless communication at a second UE is described. The apparatus may include a processor, memory coupled with the processor, and instructions stored in the memory. The instructions may be executable by the processor to cause the apparatus to transmit, using a set of transmit antennas, a first PRS, receive, using a set of receive antennas in response to the transmitted first PRS, a second PRS, the set of transmit antennas, the set of receive antennas, or both, including a set of antennas, and transmit, to a first UE, a control message indicating composite time and position information for the first PRS transmitted using the set of transmit antennas and for the second PRS received using the set of receive antennas.

Another apparatus for wireless communication at a second UE is described. The apparatus may include means for transmitting, using a set of transmit antennas, a first PRS, receiving, using a set of receive antennas in response to the transmitted first PRS, a second PRS, the set of transmit antennas, the set of receive antennas, or both, including a set of antennas, and transmitting, to a first UE, a control message indicating composite time and position information for the first PRS transmitted using the set of transmit antennas and for the second PRS received using the set of receive antennas.

A non-transitory computer-readable medium storing code for wireless communication at a second UE is described. The code may include instructions executable by a processor to transmit, using a set of transmit antennas, a first PRS, receive, using a set of receive antennas in response to the transmitted first PRS, a second PRS, the set of transmit antennas, the set of receive antennas, or both, including a set of antennas, and transmit, to a first UE, a control message indicating composite time and position information for the first PRS transmitted using the set of transmit antennas and for the second PRS received using the set of receive antennas.

Some examples of the method, apparatuses, and non-transitory computer-readable medium described herein may further include operations, features, means, or instructions for determining a composite reception time and a composite reception position associated with receiving the second PRS across the set of receive antennas, where the composite time and position information may be based on the composite reception time and the composite reception position.

In some examples of the method, apparatuses, and non-transitory computer-readable medium described herein, determining the composite reception time and the composite reception position associated with receiving the second PRS across the set of receive antennas may include operations, features, means, or instructions for determining, for each receive antenna of the set of receive antennas, a time at which the second PRS was received at the receive antenna and a position of the receive antenna, determining an average time, a weighted average time, or an arithmetic mean time for the second PRS, and determining an average position, a weighted average position, or an arithmetic mean position for the set of receive antennas associated with the second PRS.

In some examples of the method, apparatuses, and non-transitory computer-readable medium described herein, the set of receive antennas includes one receive antenna.

In some examples of the method, apparatuses, and non-transitory computer-readable medium described herein, the set of receive antennas includes a set of receive antennas.

Some examples of the method, apparatuses, and non-transitory computer-readable medium described herein may further include operations, features, means, or instructions for determining a composite transmission time and a composite transmission position associated with transmitting the first PRS across the set of transmit antennas, where the composite time and position information may be based on the composite transmission time and the composite transmission position.

In some examples of the method, apparatuses, and non-transitory computer-readable medium described herein, determining the composite transmission time and the composite transmission position associated with transmitting the first PRS across the set of transmit antennas may include operations, features, means, or instructions for determining a set of transmission times indicating a time at which the first PRS was transmitted by each transmit antenna of the set of transmit antennas, determining an average time, a weighted average time, or an arithmetic mean time for the first PRS, and determining an average position, a weighted average position, or an arithmetic mean position for the set of transmit antennas associated with the first PRS.

In some examples of the method, apparatuses, and non-transitory computer-readable medium described herein, the set of transmit antennas includes one transmit antenna.

In some examples of the method, apparatuses, and non-transitory computer-readable medium described herein, the set of transmit antennas includes a set of transmit antennas.

Some examples of the method, apparatuses, and non-transitory computer-readable medium described herein may further include operations, features, means, or instructions for transmitting, via the control message, an indication of a position of the second UE.

Some examples of the method, apparatuses, and non-transitory computer-readable medium described herein may further include operations, features, means, or instructions for receiving, from the first UE, a first sidelink transmission including an indication of a first set of resources allocated for the first PRS, a second set of resources allocated for the second PRS, or both.

In some examples of the method, apparatuses, and non-transitory computer-readable medium described herein, the control message transmitted to the first UE includes an intelligent transportation system message.

In some examples of the method, apparatuses, and non-transitory computer-readable medium described herein, the first PRS, the second PRS, or both, may be transmitted via an unlicensed radio frequency spectrum band, and where the control message may be transmitted via a licensed radio frequency spectrum band.

In some examples of the method, apparatuses, and non-transitory computer-readable medium described herein, the first PRS, the second PRS, the control message, or a combination thereof, may be transmitted via a sidelink communication link between the first UE and the second UE.

In some examples of the method, apparatuses, and non-transitory computer-readable medium described herein, the first UE includes a first vehicle, and where the second UE includes a second vehicle or a roadside unit.

DETAILED DESCRIPTION

Figure 1:
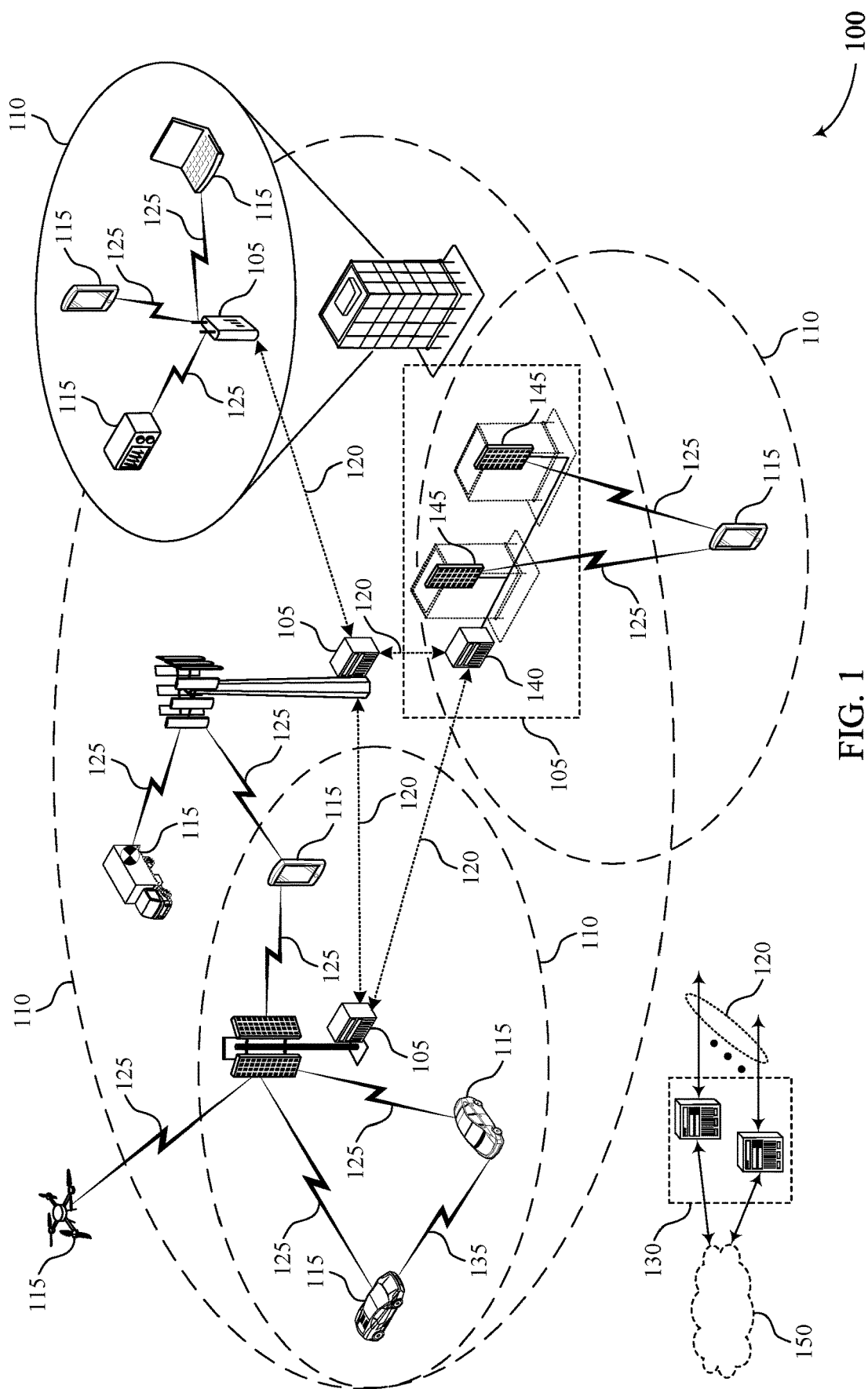
FIG. 1 illustrates an example of a wireless communications system that supports techniques for determining position over sidelink using multiple antennas in accordance with aspects of the present disclosure.

In some wireless communications systems (e.g., systems using vehicle to vehicle (V2V) communications, vehicle to everything (V2X) communications, etc.), a wireless device (e.g., a user equipment (UE)) may be configured to determine its own position and/or the position of other wireless devices based on sidelink reference signals (e.g., positioning reference signals (PRSs)) exchanged with the other wireless devices. For example, in sidelink-based (SL-b) positioning, a UE (e.g., a vehicle) may exchange PRSs with one or more other UEs (e.g., other vehicles, roadside units (RSUs)), and determine a position of the UE based on the PRSs. By way of another example, in sidelink-assisted (SL-a) positioning, a first UE (e.g., an RSU) may exchange PRSs with a second UE (e.g., a vehicle), and may determine a position of the second UE based on the PRSs. SL-b and SL-a positioning may determine positions of UEs with greater accuracy and precision as compared to some other positioning system processes (e.g., procedures using global positing system (GPS) signaling). However, in cases where a UE includes multiple transmit (Tx) antennas and/or multiple receive (Rx) antennas, the transmission times and arrival times of PRSs transmitted and received by the UE will be different for each individual antenna due to the relative location of each respective antenna. To accurately determine position with these multi-antenna UEs, a clock calibration error may be calibrated and/or estimated for each respective UE. Accordingly, these positioning techniques may suffer from ever-increasing complexity and computational cost due to the increasing numbers of antennas being used in UEs.

Accordingly, techniques for sidelink positioning with multiple antennas are described. In particular, UEs may determine composite (e.g., average, mean) transmission and reception times associated with PRSs received across sets of receive antennas, and composite transmission and reception positions associated with PRSs transmitted across sets of transmit antennas. Composite time and position information may be exchanged via a control message as part of the sidelink positioning process. Subsequently, the position of a UE may be determined based on the received control messages and the composite time and position information associated with the exchanged PRSs.

For example, a UE (e.g., a vehicle) may receive a first PRS from a second UE (e.g., an RSU) using a set of receive antennas, and transmit a second PRS to the second UE using a set of transmit antennas. One or both of the UEs may have multiple receive and/or transmit antennas. The first UE may then receive a control message from the second UE, where the control message includes time and position information indicating when and where the first PRS was transmitted by the second UE, and when and where the second PRS was received by the second UE. In some cases, the control message may additionally include the position of the second UE. To perform sidelink positioning, the first UE may determine composite time and position information for the first PRS indicating an average (e.g., weighted average, arithmetic mean) time and position at which the first PRS was received across the set of receive antennas. Composite time and position information may similarly be determined for the transmission of the second PRS. Subsequently, the position of the first UE may be determined based on the control message and the composite time and position information associated with the first and second PRSs. By determining composite time and position information across the sets of antennas, the UEs may perform sidelink positioning without having to signal and compute individual transmit and receive times and positions for each individual transmit antenna and receive antenna, thereby reducing the computational cost of the sidelink positioning process.

Aspects of the disclosure are initially described in the context of wireless communications systems. Additional aspects of the disclosure are described in the context of an example process flow. Aspects of the disclosure are further illustrated by and described with reference to apparatus diagrams, system diagrams, and flowcharts that relate to techniques for determining position over sidelink using multiple antennas.

FIG. 1 illustrates an example of a wireless communications system 100 that supports techniques for determining position over sidelink using multiple antennas in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, V2V communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 of the wireless communications system 100 may support techniques for sidelink positioning with multiple antennas. In this regard, the UEs 115 of the wireless communications system 100 may be configured to perform sidelink positioning procedures. In some examples, the techniques for sidelink positions may use V2X, V2V, or similar sidelink communications. In particular, the UEs 115 of the wireless communications system 100 may exchange PRSs, and may determine composite (e.g., average, mean) transmission and reception times associated with PRSs received across sets of receive antennas, and composite transmission and reception positions associated with PRSs transmitted across sets of transmit antennas. Composite time and position information may be exchanged via a control message as part of the sidelink positioning procedure. Subsequently, the position of a UE 115 may be determined based on the received control messages and the composite time and position information associated with the exchanged PRSs.

For example, a first UE 115 (e.g., a vehicle) may receive a first PRS from a second UE 115 (e.g., an RSU) using a set of receive antennas, and transmit a second PRS to the second UE 115 using a set of transmit antennas. One or both of the UEs 115 may have multiple receive and/or transmit antennas. The first UE 115 may then receive a control message from the second UE 115, where the control message includes time and position information indicating when and where the first PRS was transmitted by the second UE and when and where the second PRS was received by the second UE 115. In some cases, the control message may additionally include the position of the second UE 115. To perform sidelink positioning, the first UE 115 may determine composite time and position information for the first PRS indicating an average (e.g., weighted average, arithmetic mean) time and position at which the first PRS was received across the set of receive antennas. Composite time and position information may similarly be determined for the transmission of the second PRS. Subsequently, the position of the first UE 115 may be determined based on the control message and the composite time and position information associated with the first and second PRSs.

Techniques described herein may enable UEs 115 to perform sidelink positioning procedures to more accurately determine a position of the respective UEs 115. In particular, by determining composite time and position information across the sets of antennas, the UEs 115 may perform sidelink positioning without having to signal and compute individual transmit/receive times and positions for each individual transmit antenna and receive antenna. Accordingly, techniques described herein may significantly reduce the complexity of sidelink positioning procedures, and reduce the computational cost of sidelink positioning procedures within the wireless communications system 100.

Figure 2:
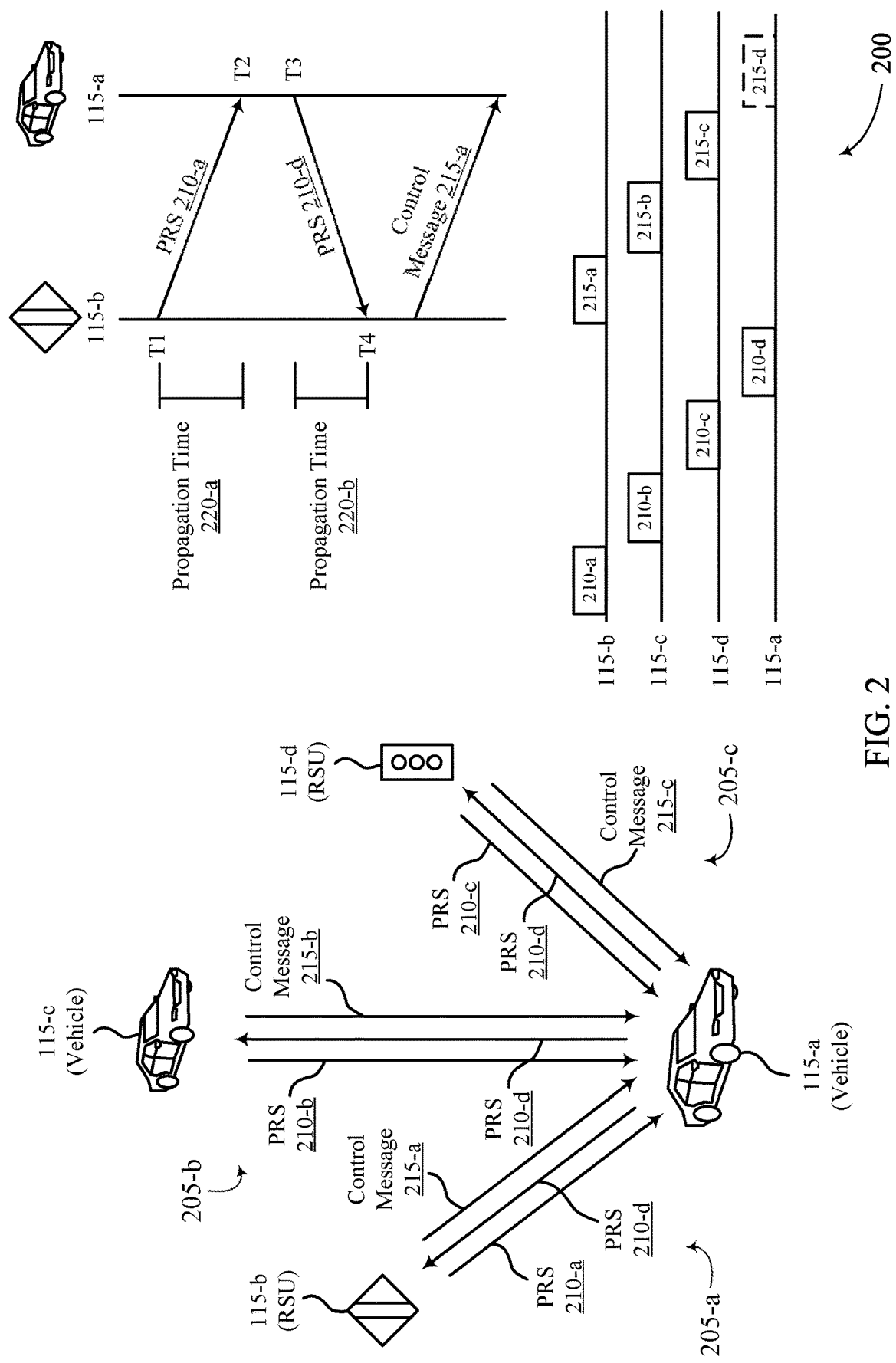
FIG. 2 illustrates an example of a wireless communications system that supports techniques for determining position over sidelink using multiple antennas in accordance with aspects of the present disclosure.

FIG. 2 illustrates an example of a wireless communications system 200 that supports techniques for determining position over sidelink (e.g., using V2V or V2X communications) using multiple antennas in accordance with aspects of the present disclosure. In some examples, wireless communications system 200 may implement aspects of wireless communications system 100. The wireless communications system 200 may include a first UE 115-a, a second UE 115-b, a third UE 115-c, and a fourth UE 115-d, which may be examples of UEs 115 described with reference to FIG. 1. In particular, in the example illustrated for wireless communications system 200, the first UE 115-a and the third UE 115-c may be examples of vehicles which are configured for sidelink positioning procedures, and the second UE 115-b and the fourth UE 115-d may be examples of RSUs which are configured for sidelink positioning procedures, as described previously herein. In other examples, a greater or fewer number of UEs 115, including any combination of vehicles, RSUs, or other UEs using sidelink communication techniques, such as V2V or V2X communications, may be present in accordance with aspects of the techniques described herein.

The UEs 115 of the wireless communications system 200 may communicate with one another via communication links 205. For example, the first UE 115-a may communicate with the second UE 115-b via a communication link 205-a. Similarly, the first UE 115-a may communicate with the third UE 115-c and the fourth UE 115-d via a communication link 205-b and a communication link 205-c, respectively. The communication links 205-a, 205-b, and 205-c may include examples of a link between two UEs 115 (e.g., a sidelink communication link, or PC5 link). In this regard, the communication links 205-a, 205-b, and 205-c may include bi-directional links between the respective UEs 115-a, 115-b, 115-c, and 115-d.

The wireless communications system 200 may support techniques for management of sensing signal interference. In particular, techniques described herein may enable the first UE 115-a to determine its position based on PRSs 210 and control messages 215 exchanged with one or more other UEs 115 (e.g., the second UE 115-b, the third UE 115-c, and/or the fourth UE 115-d). The UEs 115 of the wireless communications system 200 may include any UEs 115 which are configured to perform signaling associated with sidelink positioning procedures. For example, the first UE 115-a and the third UE 115-c may include vehicles (e.g., automobiles, airborne vehicles, autonomous vehicles), and the second UE 115-b and the fourth UE 115-b may include RSUs (e.g., RSUs coupled to streetlights, street signs, bridges, buildings). However, the UEs 115 illustrated in FIG. 2 may include any UE 115.

In some cases, the position of the second UE 115-b, the third UE 115-c, and the fourth UE 115-d may be known. For example, in cases where the second UE 115-b and the fourth UE 115-d include RSUs, the second UE 115-b and the fourth UE 115-d may be stationary, and the position of the respective UEs 115-b and 115-d may be known. In some aspects, techniques described herein may utilize the known positions of one or more UEs 115 (e.g., second UE 115-b, third UE 115-c, fourth UE 115-d, or any combination thereof) to facilitate a sidelink positioning procedure to determine the position of the first UE 115-a.

In some aspects, the first UE 115-a of the wireless communications system 200 may exchange PRSs 210 with the other UEs 115-b, 115-c, and/or 115-d, and may determine composite (e.g., average, mean) transmission and reception times associated with PRSs 210 received across sets of receive antennas of the first UE 115-a, and composite transmission and reception positions associated with PRSs 210 transmitted across sets of transmit antennas of the first UE 115-a. Composite time and position information may be exchanged via a control messages 215 as part of the sidelink positioning procedure. Subsequently, the first UE 115-a may determine a position of first UE 115-a based on the received control messages 215 and the composite time and position information associated with the exchanged PRSs 210.

For example, in some aspects, the first UE 115-a may identify one or more other UEs 115 (e.g., UEs 115-b, 115-c, and 115-d) which will be utilized for the sidelink positioning procedure. For instance, the first UE 115-a may identify and group the second UE 115-b, the third UE 115-c, and the fourth UE 115-d for the sidelink positioning procedure. In some aspects, the first UE 115-a may transmit sidelink transmissions to the second UE 115-b, the third UE 115-c, the fourth UE 115-d, or any combination thereof. In this regard, the first UE 115-a may "initiate" the sidelink positioning procedure, and reserve sets of resources for the respective UEs 115-a, 115-b, 115-c, and 115-d to perform listen-before-talk (LBT) communications for the sidelink positioning procedure.

The sidelink transmissions may include indications of sets of resources allocated for PRSs 210 and/or control messages 215 transmitted to/from each of the respective UEs 115-b, 115-c, and 115-d. For example, the first UE 115-a may transmit a first sidelink transmission to the second UE 115-b, where the first sidelink transmission includes an indication of a set of resources for a PRS 210-a transmitted by the second UE 115-b to the first UE 115-a, a set of resources for a PRS 210-d transmitted from the first UE 115-a to the second UE 115-b, a set of resources for a control message 215-a transmitted by the second UE 115-b to the first UE 115-a, a set or resources for a control message 215-d transmitted from the first UE 115-a to the second UE 115-b, or any combination thereof. In some aspects, the sidelink transmissions to each of the UEs 115-b, 115-c, and 115-d may be transmitted via sidelink communication links between the first UE 115-a, the second UE 115-b, the third UE 115-c, and the fourth UE 115-d, respectively.

In some aspects, the first UE 115-a may receive PRSs 210 from each of the second UE 115-b, the third UE 115-c, and the fourth UE 115-d. For example, the first UE 115-a may receive a PRS 210-a from the second UE 115-b, a PRS 210-b from the third UE 115-c, and a PRS 210-c from the fourth UE 115-d. In some aspects, the UEs 115-b, 115-c, and 115-d may transmit the PRSs 210-a, 210-b, and 210-c, respectively, based on (e.g., in response to) the sidelink transmissions received from the first UE 115-a. In this regard, the PRSs 210-a, 210-b, and 210-c may be transmitted via the sets of resources allocated for the respective PRSs 210-a, 210-b, and 210-c, as indicated in the sidelink transmissions received from the first UE 115-a. In some aspects, the PRSs 210-a, 210-b, and 210-c may be transmitted via sidelink communication links between the first UE 115-a, the second UE 115-b, the third UE 115-c, and the fourth UE 115-d, respectively.

In some aspects, the PRSs 210-a, 210-b, and 210-c may be transmitted via an unlicensed or shared licensed radio frequency spectrum band. In some cases, each of the second UE 115-b, the third UE 115-c, and the fourth UE 115-d may transmit the respective PRSs 210-a, 210-b, and 210-c via sequential broadcast transmissions. For example, as shown in FIG. 2, the second UE 115-b may transmit (e.g., broadcast) the PRS 210-a, followed by the third UE 115-c transmitting (e.g., broadcasting) the PRS 210-b, followed by the fourth UE 115-d transmitting (e.g., broadcasting) the PRS 210-c.

The first UE 115-e may receive the each of the respective PRSs 210-a, 210-b, and 210-c using a set of receive antennas. In some cases, the set of receive antennas may include a single receive antenna. In alternative cases, the set of receive antennas may include a plurality of receive antennas. Similarly, the each of the second UE 115-b, the third UE 115-c, and the fourth UE 115-d may transmit the respective PRSs 210-a, 210-b, and 210-c using a set of transmit antennas. In some cases, the sets of transmit antennas of the second UE 115-b, the third UE 115-c, and the fourth UE 115-d may each include a single transmit antenna. In alternative cases, the sets of transmit antennas of the second UE 115-b, the third UE 115-c, and the fourth UE 115-d may each include a plurality of transmit antennas.

In some aspects, the first UE 115-a may transmit (e.g., broadcast) a PRS 210-d to the second UE 115-b, the third UE 115-c, the fourth UE 115-d, or any combination thereof. For example, in cases where the first UE 115-a receives the PRSs 210-a, 210-b, and 210-c from each of the UEs 115-b, 115-c, and 115-d, the first UE 115-a may transmit (e.g., broadcast) the PRS 210-d to each of the second UE 115-b, the third UE 115-c, and the fourth UE 115-d. By way of another example, in cases where the first UE 115-a receives only the PRS 210-b from the second UE 115-b, the first UE 115-a may transmit the PRS 210-d to only the second UE 115-b.

In some aspects, the first UE 115-a may transmit the PRS 210-d using a set of transmit antennas. In some cases, the set of transmit antennas may include a single transmit antenna. In alternative cases, the set of transmit antennas may include a plurality of transmit antennas. The set of transmit antennas used to transmit the PRS 210-d may be the same or different from the set of receive antennas used to receive the PRSs 210-a, 210-b, and 210-c. In some aspects, the second UE 115-b, the third UE 115-c, and the fourth UE 115-d may each receive the PRS 210-d using respective sets of receive antennas. In some cases, the sets of receive antennas of the UEs 115-*b*, 115-*c*, and 115-*d* may each include a single receive antenna. In alternative cases, the sets of receive antennas of the UEs 115-*b*, 115-*c*, and 115-*d* may each include a plurality of receive antennas.

In some aspects, the first UE 115-*a* may transmit the PRS 210-*d* based on (e.g., in response to) transmitting the first sidelink transmissions to the UEs 115-*b*, 115-*c*, and 115-*d*, receiving the PRSs 210-*a*, 210-*b*, and 210-*c*, or any combination thereof. For example, the first UE 115-*a* may transmit the PRS 210-*d* via the set of resources allocated for the PRS 210-*d* indicated in the sidelink transmissions transmitted to the respective UEs 115-*b*, 115-*c*, and 115-*d*. The PRS 210-*d* may be transmitted to the second UE 115-*b*, the third UE 115-*d*, and the fourth UE 115-*d* via the sidelink communication links between the first UE 115-*a*, the second UE 115-*b*, the third UE 115-*c*, and the fourth UE 115-*d* respectively. In some aspects, the PRS 210-*d* may be transmitted via the unlicensed radio frequency spectrum band.

As shown in FIG. 2, the first UE 115-*a* may transmit the PRS 210-*d* to each of the second UE 115-*b*, the third UE 115-*c*, and the fourth UE 115-*d* after receiving the respective PRSs 210-*a*, 210-*b*, and 210-*c*. In this regard, the first UE 115-*a* may transmit the PRS 210-*d* as a broadcast transmission, a multicast transmission, or both, to each of the respective UEs 115-*b*, 115-*c*, and 115-*d*. In additional or alternative aspects, the first UE 115-*a* may transmit separate PRSs 210 to each of the second UE 115-*b*, the third UE 115-*c*, and the fourth UE 115-*d*. For example, in some cases, the first UE 115-*a* may transmit the PRS 210-*d* to the second UE 115-*b*, transmit a separate PRS 210 to the third UE 115-*c*, and transmit a separate PRS 210 to the fourth UE 115-*d*. In this example, the each of the PRSs 210 (e.g., PRS 210-*d*) transmitted by the first UE 115-*a* may be transmitted as unicast transmissions. Moreover, in this example, each of the PRSs 210 (e.g., PRS 210-*d*) transmitted by the first UE 115-*a* may be associated with respective, individual sets of resources.

In some aspects, each of the second UE 115-*b*, the third UE 115-*c*, and the fourth UE 115-*d* may determine composite transmission times and positions, and composite reception times and positions, associated with the respective PRSs 210-*a*, 210-*b*, 210-*c*, and 210-*d* transmitted and received by the respective UEs 115-*b*, 115-*c*, and 115-*d*. The UEs 115-*b*, 115-*c*, and 115-*d* may determine composite transmission/reception times and positions based on receiving the sidelink transmissions from the first UE 115-*a*, transmitting the respective PRSs 210-*a*, 210-*b*, and 210-*c*, receiving the PRS 210-*d*, or any combination thereof.

For example, the second UE 115-*b* may determine a composite transmission time and a composite transmission position associated with transmitting the PRS 210-*a* across the set of transmit antennas of the second UE 115-*b*. In this regard, the second UE 115-*b* may determine when and where the PRS 210-*a* was transmitted by the second UE 115-*a*. For instance, the second UE 115-*b* may determine a set of transmission times indicating a time at which the PRS 210-*a* was transmitted by each transmit antenna of the set of transmit antennas. By way of example, in cases where the set of transmit antennas of the second UE 115-*b* include three transmit antennas, the second UE 115-*b* may determine a first transmit time at which the PRS 210-*a* was transmitted by the first transmit antenna, a second transmit time at which the PRS 210-*a* was transmitted by the second transmit antenna, and a third transmit time at which the PRS 210-*a* was transmitted by the third transmit antenna. In this example, the second UE 115-*b* may determine the composite transmission time (e.g., T1) for the PRS 210-*a* across the set of transmit antennas by combining the first transmit time, the second transmit time, and the third transmit time. In this regard, the second UE 115-*b* may determine a composite transmission time at T1 representing a composite time at which the PRS 210-*a* was transmitted by the second UE 115-*b* across the set of transmit antennas of the second UE 115-*b*. The respective transmit times may be combined to form the composite transmission time (e.g., T1) using any mathematical operation, formula, or algorithm known in the art including, but not limited to, an average, a weighted average, an arithmetic mean, a median, or the like.

For example, the second UE 115-*b* may determine the composite transmission time T1 associated with transmitting the PRS 210-*a* across the set of transmit antennas including M transmit antennas according to Equation 1:

$$T1 = \frac{1}{M}\sum_{k=1}^{M} t_{1;k} \quad (1)$$

where T1 defines the composite transmission time associated with transmitting the PRS 210-*a* across the set of transmit antennas of the second UE 115-*b*, M defines a quantity of transmit antennas in the set of transmit antennas, and $t_{1;k}$ defines a transmit time of the PRS 210-*a* at transmit antenna k.

Additionally, the second UE 115-*b* may determine a composite transmission position associated with transmitting the PRS 210-*a* across the set of transmit antennas of the second UE 115-*b*. For example, the second UE 115-*b* may determine a set of positions associated with each transmit antenna of the set of transmit antennas. For instance, in cases where the set of transmit antennas of the second UE 115-*b* include three transmit antennas, the second UE 115-*b* may determine a first transmit position associated with the first transmit antenna, a second transmit position associated with the second transmit antenna, and a third transmit position associated with the third transmit antenna. In this example, the second UE 115-*b* may determine the composite transmission position for the PRS 210-*a* across the set of transmit antennas by combining the first transmit position, the second transmit position, and the third transmit position. The respective transmit positions may be combined to form the composite transmission position using any mathematical operation, formula, or algorithm known in the art including, but not limited to, an average, a weighted average, an arithmetic mean, a median, or the like.

For example, the second UE 115-*b* may determine the composite transmission position associated with transmitting the PRS 210-*a* across the set of transmit antennas including M transmit antennas according to Equation 2:

$$R1 = \frac{1}{M}\sum_{k=1}^{M} r_{1;k} \quad (2)$$

where R1 defines the composite transmission position associated with transmitting the PRS 210-*a* across the set of transmit antennas of the second UE 115-*b*, M defines a quantity of transmit antennas in the set of transmit antennas, and $r_{1;k}$ defines a transmit position of the PRS 210-*a* at transmit antenna k.

Similarly, the second UE 115-*b* may determine a composite reception time associated with receiving the PRS 210-*d* across the set of receive antennas of the second UE 115-*b*. For instance, the second UE 115-*b* may determine a set of receive times indicating a time at which the PRS 210-*d* was received by each receive antenna of the set of receive antennas. By way of example, in cases where the set of receive antennas of the second UE 115-*b* include three receive antennas, the second UE 115-*b* may determine a first receive time at which the PRS 210-*d* was received by the first receive antenna, a second receive time at which the PRS 210-*d* was received by the second receive antenna, and a third receive time at which the PRS 210-*d* was received by the third receive antenna. In this example, the second UE 115-*b* may determine the composite reception time (e.g., T4) for the PRS 210-*d* across the set of receive antennas by combining the first receive time, the second receive time, and the third receive time. In this regard, the second UE 115-*b* may determine a composite reception time at T4 representing a composite time at which the PRS 210-*d* was received by the second UE 115-*b* across the set of receive antennas of the second UE 115-*b*. The respective receive times may be combined to form the composite reception time (e.g., T4) using any mathematical operation, formula, or algorithm known in the art including, but not limited to, an average, a weighted average, an arithmetic mean, a median, or the like.

For example, the second UE 115-*b* may determine the composite reception time T4 associated with receiving the PRS 210-*d* across the set of receive antennas including N receive antennas according to Equation 3:

$$T4 = \frac{1}{N}\sum_{k=1}^{N} t_{4;k} \quad (3)$$

where T4 defines the composite reception time associated with receiving the PRS 210-*d* across the set of receive antennas of the second UE 115-*b*, N defines a quantity of receive antennas in the set of receive antennas, and $t_{4;k}$ defines a receive time of the PRS 210-*d* at receive antenna k.

Additionally, the second UE 115-*b* may determine a composite reception position associated with receiving the PRS 210-*d* across the set of receive antennas of the second UE 115-*b*. For example, the second UE 115-*b* may determine a set of positions associated with each receive antenna of the set of receive antennas. For instance, in cases where the set of receive antennas of the second UE 115-*b* include three receive antennas, the second UE 115-*b* may determine a first receive position associated with the first receive antenna, a second receive position associated with the second receive antenna, and a third receive position associated with the third receive antenna. In this example, the second UE 115-*b* may determine the composite reception position for the PRS 210-*d* across the set of receive antennas by combining the first receive position, the second receive position, and the third receive position. In this regard, the second UE 115-*b* may determine a composite reception position representing a composite position at which the PRS 210-*d* was received by the second UE 115-*b* across the set of receive antennas of the second UE 115-*b*. The respective receive positions may be combined to form the composite reception position using any mathematical operation, formula, or algorithm known in the art including, but not limited to, an average, a weighted average, an arithmetic mean, a median, or the like.

For example, the second UE 115-*b* may determine the composite reception position associated with receiving the PRS 210-*d* across the set of receive antennas including N receive antennas according to Equation 4:

$$R4 = \frac{1}{N}\sum_{k=1}^{N} r_{4;k} \quad (4)$$

where R4 defines the composite reception position associated with receiving the PRS 210-*d* across the set of receive antennas of the second UE 115-*b*, N defines a quantity of receive antennas in the set of receive antennas, and $r_{4;k}$ defines a receive position of the PRS 210-*d* at transmit antenna k.

In a similar manner, each of the third UE 115-*c* and the fourth UE 115-*d* may determine composite transmission/reception times and positions for the respective PRSs 210 transmitted and received by the respective UEs 115-*c* and 115-*d*. For example, the third UE 115-*c* may determine a composite transmission time and a composite transmission position associated with transmitting the PRS 210-*b* across the set of transmit antennas of the third UE 115-*c*, and may determine a composite reception time and a composite reception position associated with receiving the PRS 210-*d* across the set of receive antennas of the third UE 115-*c*. Similarly, the fourth UE 115-*d* may determine a composite transmission time and a composite transmission position associated with transmitting the PRS 210-*c* across the set of transmit antennas of the fourth UE 115-*d*, and may determine a composite reception time and a composite reception position associated with receiving the PRS 210-*d* across the set of receive antennas of the fourth UE 115-*d*. As discussed previously herein with respect to the second UE 115-*b*, the third UE 115-*c* and the fourth UE 115-*d* may determine composite transmission/reception times and positions using any mathematical operation, formula, or algorithm known in the art including, but not limited to, an average, a weighted average, an arithmetic mean, a median, or the like.

In some aspects, the first UE 115-*a* may receive control messages 215-*a*, 215-*b*, and 215-*c* from second UE 115-*b*, the third UE 115-*c*, and the fourth UE 115-*d*, respectively. In some aspects, the first UE 115-*a* may receive the control messages 215-*a*, 215-*b*, and 215-*c* based on (e.g., in response to) transmitting the sidelink transmissions to the UEs 115-*b*, 115-*c*, and 115-*d*, receiving the PRSs 210-*a*, 210-*b*, and 210-*c*, transmitting the PRS 210-*d*, or any combination thereof. Moreover, each of the second UE 115-*b*, the third UE 115-*c*, and the fourth UE 115-*d* may transmit the respective control messages 215-*a*, 215-*b*, and 215-*c* based on determining composite transmission/reception times and positions associated with the respective UEs 115-*b*, 115-*c*, and 115-*d*. For example, the second UE 115-*b* may transmit the control message 215-*a* based on the sets of resources indicated in the sidelink transmission received from the first UE 115-*a*, the composite transmission time and position associated with transmitting the PRS 210-*a*, and the composite reception time and position associated with receiving the PRS 210-*d*.

In some aspects, the control messages 215-*a*, 215-*b*, and 215-*c* may include an indication of a position associated with the respective UEs 115-*b*, 115-*c*, and 115-*d*. For example, the control message 215-*a* may include an indication of a position of the second UE 115-*b*, the control message 215-*b* may include an indication of a position of the third UE 115-c, and the control message 215-c may include an indication of a position of the fourth UE 115-d. The control messages 215-a, 215-b, and 215-c may be transmitted via the sidelink communication links between the first UE 115-a, the second UE 115-b, the third UE 115-c, and the fourth UE 115-d, respectively. In some aspects, the control messages 215-a, 215-b, and 215-c may be transmitted via a licensed radio frequency spectrum band. For example, the control messages 215-a, 215-b, and 215-c may include intelligent transportation system (ITS) messages transmitted via a licensed radio frequency spectrum band.

In some aspects, the control messages 215-a, 215-b, and 215-c may indicate time and position information associated with the PRSs 210-a, 210-b, and 210-b transmitted by the second UE 115-b, the third UE 115-c, and the fourth UE 115-d, respectively. In this regard, the control message 215-a may indicate time and position information associated with the PRS 210-a transmitted by the second UE 115-b, time and position information associated with the PRS 210-d received by the second UE 115-b, or both. By way of another example, the control message 215-b may indicate time and position information associated with the PRS 210-b transmitted by the third UE 115-c, time and position information associated with the PRS 210-d received by the third UE 115-c, or both.

In some aspects, the time and position information indicated in the respective control messages 215-a, 215-b, and 215-d may include composite transmission/reception times and positions associated with each of the respective UEs 115-b, 115-c, and 115-d. For example, the control message 215-a transmitted by the second UE 115-b may indicate the composite time and position information for the PRS 210-a transmitted using the set of transmit antennas of the second UE 115-b, the composite time and position information for the PRS 210-d received using the set of receive antennas of the second UE 115-b, or both. For instance, the control message 215-a may include the composite transmission time (e.g., T1) associated with transmitting the PRS 210-a across the set of transmit antennas of the second UE 115-b, and the composite transmission position associated with transmitting the PRS 210-a across the set of transmit antennas of the second UE 115-b. Similarly, the control message 215-a may include the composite reception time (e.g., T4) associated with receiving the PRS 210-d across the set of receive antennas of the second UE 115-b, and the composite reception position associated with receiving the PRS 210-d across the set of receive antennas of the second UE 115-b. In this regard, the control message 215-a may include an indication of when and where the PRS 210-a was transmitted by the second UE 115-b, and an indication of when and where the PRS 210-d was received by the second UE 115-b.

In some aspects, the first UE 115-a may determine composite transmission times and positions associated with transmitting the PRS 210-d, and composite reception times and positions associated with receiving PRSs 210-a, 210-b, and 210-c. In some aspects, the first UE 115-a may determine composite transmission/reception times and positions based on transmitting the sidelink transmissions to the respective UEs 115-b, 115-c, and 115-d, receiving the PRSs 210-a, 210-b, and 210-c, transmitting the PRS 210-d, receiving the control messages 215-a, 215-b, and 215-d, or any combination thereof.

For example, the first UE 115-a may determine a composite transmission time and a composite reception position associated with receiving the PRS 210-a across the set of receive antennas of the first UE 115-a. In this regard, the first UE 115-a may determine when and where the PRS 210-a was received by the first UE 115-a. For instance, the first UE 115-a may determine a set of reception times indicating a time at which the PRS 210-a was received by each receive antenna of the set of receive antennas. By way of example, in cases where the set of receive antennas of the first UE 115-a include three receive antennas, the first UE 115-a may determine a first receive time at which the PRS 210-a was received by the first receive antenna, a second receive time at which the PRS 210-a was received by the second receive antenna, and a third receive time at which the PRS 210-a was received by the third transmit antenna. In this example, the first UE 115-a may determine the composite reception time (e.g., T2) for the PRS 210-a across the set of receive antennas by combining the first receive time, the second receive time, and the third receive time. In this regard, the first UE 115-a may determine a composite reception time at T2 representing a composite time at which the PRS 210-a was received by the first UE 115-a across the set of receive antennas of the first UE 115-a. The respective receive times may be combined to form the composite reception time (e.g., T2) using any mathematical operation, formula, or algorithm known in the art including, but not limited to, an average, a weighted average, an arithmetic mean, a median, or the like.

Additionally, the first UE 115-a may determine a composite reception position associated with receiving the PRS 210-a across the set of receive antennas of the first UE 115-a. For example, the first UE 115-a may determine a set of positions associated with each receive antenna of the set of receive antennas. For instance, in cases where the set of receive antennas of the first UE 115-a includes three receive antennas, the first UE 115-a may determine a first receive position associated with the first receive antenna, a second receive position associated with the second receive antenna, and a third receive position associated with the third receive antenna. In this example, the first UE 115-a may determine the composite reception position for the PRS 210-a across the set of receive antennas by combining the first receive position, the second receive position, and the third receive position. The respective receive positions may be combined to form the composite reception position using any mathematical operation, formula, or algorithm known in the art including, but not limited to, an average, a weighted average, an arithmetic mean, a median, or the like.

Similarly, the first UE 115-a may determine a composite transmission time associated with transmitting the PRS 210-d across the set of transmit antennas of the first UE 115-a. For instance, the first UE 115-a may determine a set of transmit times indicating a time at which the PRS 210-d was transmitted by each transmit antenna of the set of transmit antennas. By way of example, in cases where the set of transmit antennas of the first UE 115-a include three transmit antennas, the first UE 115-a may determine a first transmit time at which the PRS 210-d was transmitted by the first transmit antenna, a second transmit time at which the PRS 210-d was transmitted by the second transmit antenna, and a third transmit time at which the PRS 210-d was transmitted by the third transmit antenna. In this example, the first UE 115-a may determine the composite transmission time (e.g., T3) for the second PRS 210-d across the set of transmit antennas by combining the first transmit time, the second transmit time, and the third transmit time. In this regard, the first UE 115-a may determine a composite transmission time at T3 representing a composite time at which the PRS 210-d was transmitted by the first UE 115-a across the set of transmit antennas of the first UE 115-a. The respective transmit times may be combined to form the composite transmission time (e.g., T3) using any mathematical operation, formula, or algorithm known in the art including, but not limited to, an average, a weighted average, an arithmetic mean, a median, or the like.

Additionally, the first UE 115-a may determine a composite transmission position associated with transmitting the PRS 210-d across the set of transmit antennas of the first UE 115-a. For example, the first UE 115-a may determine a set of positions associated with each transmit antenna of the set of transmit antennas. For instance, in cases where the set of transmit antennas of the first UE 115-a include three transmit antennas, the first UE 115-a may determine a first transmit position associated with the first transmit antenna, a second transmit position associated with the second transmit antenna, and a third transmit position associated with the third transmit antenna. In this example, the first UE 115-a may determine the composite transmission position for the PRS 210-d across the set of transmit antennas by combining the first transmit position, the second transmit position, and the third transmit position. In this regard, the first UE 115-a may determine a composite transmission position representing a composite position at which the PRS 210-d was transmitted by the first UE 115-a across the set of transmit antennas of the first UE 115-a. The respective transmit positions may be combined to form the composite transmission position using any mathematical operation, formula, or algorithm known in the art including, but not limited to, an average, a weighted average, an arithmetic mean, a median, or the like.

In some aspects, the first UE 115-a may determine propagation times 220 associated with the PRSs 210-a, 210-b, 210-c, and 210-d. In some aspects, the first UE 115-a may determine the propagation times 220 of the respective PRSs 210-a, 210-b, 210-c, and 210-d based on the control messages 215-a, 215-b, and 215-c, determining the composite transmission/reception times associated with the first UE 115-a, or any combination thereof.

For example, the first UE 115-a may determine a first propagation time 220-a associated with the PRS 210-a based on the composite time and position information for the PRS 210-a transmitted by the second UE 115-b, composite time and position information for the PRS 210-a received by the first UE 115-a, or both. By way of another example, the first UE 115-a may determine a second propagation time 220-b associated with the PRS 210-d based on the composite time and position information for the PRS 210-d transmitted by the first UE 115-a, composite time and position information for the PRS 210-d received by the second UE 115-b, or both.

In some aspects, the first UE 115-a may estimate a clock calibration error associated with the set of receive antennas of the first UE 115-a, the set of transmit antennas of the first UE 115-a, or both. In some aspects, the first UE 115-a may estimate the clock calibration error based on the control messages 215-a, 215-b, and 215-c, determining the composite transmission/reception times associated with the first UE 115-a, or any combination thereof.

In some aspects, determining composite transmission and reception times may significantly simplify the estimation of clock calibration errors. For example, in some conventional sidelink positioning procedures, a multi-antenna UE may have to estimate a clock calibration error for each individual transmit antenna and receive antenna. This may result in significant computational cost and power consumption. Comparatively, by determining composite transmission and reception times for transmitting and receiving PRSs 210, techniques described herein may reduce the quantity of clock calibration errors which may be calculated. Moreover, the quantity of clock calibration errors may be fixed, and may require fewer data samples for convergence of the clock calibration errors as compared to some conventional sidelink positioning procedures.

In some aspects, the first UE 115-a may determine a position of the first UE 115-a. In some aspects, the first UE 115-a may determine the position of the first UE 115-a based on the control messages 215-a, 215-b, and 215-c, the composite transmission/reception times and positions associated with the first UE 115-a, the propagation times 220 determined associated with the respective PRSs 210-a, 210-b, 210-c, and 210-d, the estimated clock calibration error(s), or any combination thereof. Additionally or alternatively, the first UE 115-a may determine the position of the first UE1 115-a based on the indications of the positions of the second UE 115-b, the third UE 115-c, the fourth UE 115-d, or any combination thereof. In some aspects, the first UE 115-a may determine the position of the first UE 115-a based on a propagation speed, or an estimated propagation speed, of the PRSs 210 (e.g., the speed of light).

For example, the first UE 115-a may determine the position of the first UE 115-a based on the composite time and position information for the PRS 210-a transmitted by the second UE 115-b, the composite time and position information for the PRS 210-a received by the first UE 115-a, the composite time and position information for the PRS 210-d transmitted by the first UE 115-a, and the composite time and position information for the PRS 210-d received by the second UE 115-b. For instance, the first UE 115-a may determine the position of the first UE 115-a according to Equation 5:

$$z_n = (T4 - T3) + (T2 - T1) = \frac{\|r - x(t_n)\|}{v_{light}} + \alpha \tag{5}$$

where r is the position of the second UE 115-b and $v_{light}$ is the speed of light.

In some aspects, the first UE 115-a may optionally transmit a control message 215-d to the second UE 115-b, the third UE 115-c, the fourth UE 115-d, or any combination thereof. In some aspects, as shown in FIG. 2, the first UE 115-a may transmit the control message 215-d after receiving each of the control messages 215-a, 215-b, and 215-c. In some aspects, the control message 215-d may indicate time and position information associated with the PRSs 210-a, 210-b, 210-c, and 210-d transmitted and received by the first UE 115-a. For example, the control message 215-d may indicate time and position information associated with the PRSs 210-a, 210-b, and 210-c received by the first UE 115-a, time and position information associated with the PRS 210-d transmitted by the first UE 115-a, or both. For instance, the control message 215-d may include composite transmission/reception times and positions associated with PRSs 210 transmitted and received by the first UE 115-a.

In some aspects, the control message 215-d may be used by the UEs 115-b, 115-c, and 115-d to determine the position of the first UE 115-a. In particular, the control message 215-d may enable SL-a positioning, in which the second UE 115-b, the third UE 115-c, the fourth UE 115-d, or any combination thereof, determines the position of the first UE 115-a. In some aspects, the UEs 115-b, 115-c, and 115-d may determine the position of the first UE 115-a based on the control message 215-d. In such cases, the UEs 115-b, 115-c, and 115-d may transmit respective sidelink transmissions to the first UE 115-a, where the sidelink transmissions indicate the position of the first UE 115-a determined by the respective UEs 115-*b*, 115-*c*, and 115-*d*. In some cases, the first UE 115-*a* may be configured to determine its position based on the positions of the first UE 115-*a* determined by the UEs 115-*b*, 115-*c*, 115-*d* which were indicated in the sidelink transmissions.

Techniques described herein may enable the first UE 115-*a* to perform sidelink positioning procedures to more accurately determine a position of the first UE 115-*a*. In particular, by determining composite time and position information across the sets of antennas, the first UE 115-*a* may perform sidelink positioning without having to signal and compute individual transmit/receive times and positions for each individual transmit antenna and receive antenna. Accordingly, techniques described herein may significantly reduce the complexity of sidelink positioning procedures, and reduce the computational cost of sidelink positioning procedures within the wireless communications system 200.

Figure 3:
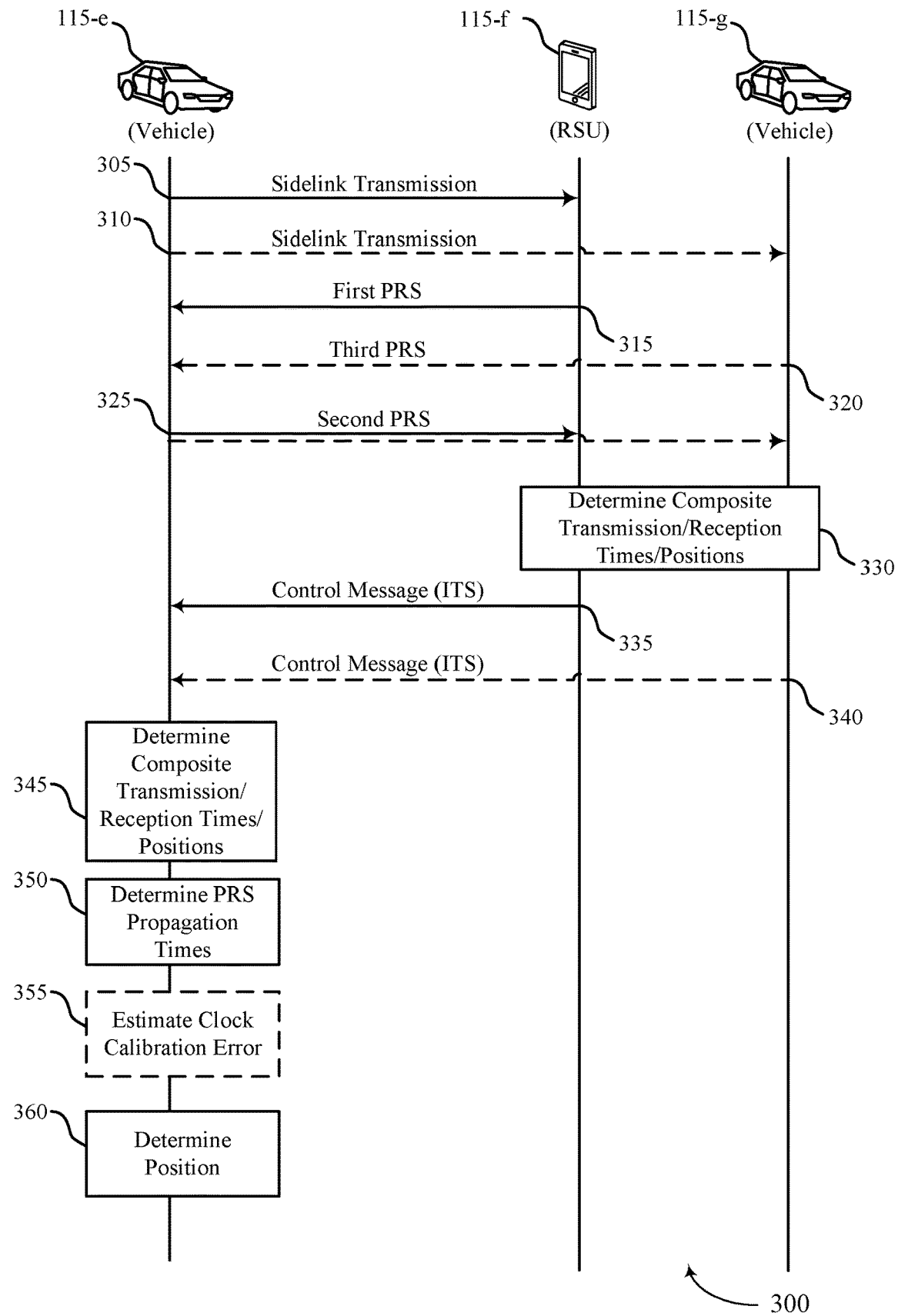
FIG. 3 illustrates an example of a wireless communications system that supports techniques for determining position over sidelink using multiple antennas in accordance with aspects of the present disclosure.

FIG. 3 illustrates an example of a process flow 300 that supports techniques for determining position over sidelink using multiple antennas in accordance with aspects of the present disclosure. In some examples, process flow 300 may implement, or be implemented by, aspects of wireless communications system 100 or 200. For example, the process flow 300 may illustrate a first UE 115-*e* receiving a first PRS, transmitting a second PRS, receiving a control message, and determining a position of the first UE 115-*e* based on the control message and composite time and position information, as described with reference to FIGS. 1-2.

In some cases, process flow 300 may include a first UE 115-*e*, a second UE 115-*f*, and a third UE 115-*g*, which may be examples of corresponding devices as described herein. The first UE 115-*e*, the second UE 115-*f*, and the third UE 115-*g* illustrated in FIG. 3 may be examples of the first UE 115-*a*, the second UE 115-*b*, and the third UE 115-*c*, respectively, illustrated in FIG. 2. In this regard, the first UE 115-*e* and the third UE 115-*g* may include examples of vehicles configured for sidelink positioning procedures, and the second UE 115-*f* may include an example of an RSU configured for sidelink positioning procedures. In some aspects, the first UE 115-*e* may communicate with the second UE 115-*f* and the third UE 115-*g* over sidelink communication links, such as the communication links 205-*a* and 205-*b* illustrated in FIG. 2.

In some examples, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 305, the first UE 115-*e* may transmit a first sidelink transmission to the second UE 115-*f*. In some aspects, the first sidelink transmission may include an indication of a set of resources allocated for a first PRS from the second UE 115-*f* to the first UE 115-*e*. Additionally or alternatively, the first sidelink transmission may include an indication of a set of resources allocated for a second PRS from the first UE 115-*e* to the second UE 115-*f*, a set of resources for a control message from the second UE 115-*f* to the first UE 115-*e*, or both. The sets of resources may each include a set of time resources and a set of frequency resources for transmitting or receiving the respective PRS or control message. In some aspects, the first sidelink transmission may be transmitted via a sidelink communication link between the first UE 115-*e* and the second UE 115-*f*.

At 310, the first UE 115-*e* may transmit a second sidelink transmission to the third UE 115-*g*. In some aspects, the second sidelink transmission may include an indication of a set of resources allocated for a third PRS from the third UE 115-*g* to the first UE 115-*e*. Additionally or alternatively, the second sidelink transmission may include an indication of the set of resources allocated for the second PRS from the first UE 115-*e* to the third UE 115-*g*, a set of resources for a control message from the third UE 115-*g* to the first UE 115-*e*, or both. In addition to, or in the alternate to, the set of resources allocated for the second PRS from the first UE 115-*e* to the third UE 115-*g*, the second sidelink transmission may include an indication of a set of resources for a fourth PRS (not shown) from the first UE 115-*e* to the third UE 115-*g*. The sets of resources may each include a set of time resources and a set of frequency resources for transmitting or receiving the respective PRS or control message. In some aspects, the first sidelink transmission may be transmitted via a sidelink communication link between the first UE 115-*e* and the third UE 115-*g*.

At 315, the first UE 115-*e* may receive the first PRS from the second UE 115-*f*. The first UE 115-*e* may receive the first PRS using a set of receive antennas. In some cases, the set of receive antennas may include a single receive antenna. In alternative cases, the set of receive antennas may include a plurality of receive antennas. Similarly, the second UE 115-*f* may transmit the first PRS using a set of transmit antennas. In some cases, the set of transmit antennas of the second UE 115-*f* may include a single transmit antenna. In alternative cases, the set of transmit antennas of the second UE 115-*f* may include a plurality of transmit antennas.

In some aspects, the second UE 115-*f* may transmit the first PRS at 315 based on (e.g., in response to) the first sidelink transmission received at 305. In this regard, the first PRS may be transmitted via the set of resources allocated for the first PRS indicated in the first sidelink transmission. The first PRS may be transmitted via the sidelink communication link between the first UE 115-*e* and the second UE 115-*f*. In some aspects, the first PRS may be transmitted via an unlicensed radio frequency spectrum band.

At 320, the first UE 115-*e* may receive the third PRS from the third UE 115-*g*. The first UE 115-*e* may receive the third PRS using the set of receive antennas. Similarly, the third UE 115-*g* may transmit the third PRS using a set of transmit antennas. In some cases, the set of transmit antennas of the third UE 115-*g* may include a single transmit antenna. In alternative cases, the set of transmit antennas of the third UE 115-*g* may include a plurality of transmit antennas.

In some aspects, the third UE 115-*g* may transmit the third PRS at 320 based on (e.g., in response to) the second sidelink transmission received at 310. In this regard, the third PRS may be transmitted via the set of resources allocated for the third PRS indicated in the second sidelink transmission. The third PRS may be transmitted via the sidelink communication link between the first UE 115-*e* and the third UE 115-*g*. In some aspects, the third PRS may be transmitted via the unlicensed radio frequency spectrum band.

At 325, the first UE 115-*e* may transmit the second PRS to the second UE 115-*f*, the third UE 115-*g*, or both. For example, in cases where the first UE 115-*e* receives both the first PRS and the third PRS from the second UE 115-*f* and the third UE 115-*g*, respectively, the first UE 115-*e* may transmit the second PRS at 325 to both the second UE 115-*f* and the third UE 115-*g*. By way of another example, in cases where the first UE 115-*e* receives only the first PRS from the second UE 115-*f*, the first UE 115-*e* may transmit the second PRS at 325 to only the second UE 115-*f*.

In some aspects, the first UE 115-*f* may transmit the second PRS using a set of transmit antennas. In some cases, the set of transmit antennas may include a single transmit antenna. In alternative cases, the set of transmit antennas may include a plurality of transmit antennas. The set of transmit antennas used to transmit the second PRS at 325 may be the same or different from the set of receive antennas used to receive the first PRS at 315 and the third PRS at 320. In some aspects, the second UE 115-*f* and the third UE 115-*g* may each receive the second PRS using respective sets of receive antennas. In some cases, the sets of receive antennas of the second UE 115-*f* and the third UE 115-*g* may include a single receive antenna. In alternative cases, the set of receive antennas of the second UE 115-*f* and the third UE 115-*g* may include a plurality of receive antennas.

In some aspects, the first UE 115-*e* may transmit the second PRS at 325 based on (e.g., in response to) transmitting the first sidelink transmission at 305, transmitting the second sidelink transmission at 310, receiving the first PRS at 315, receiving the third PRS at 320, or any combination thereof. For example, the first UE 115-*e* may transmit the second PRS via the set of resources allocated for the second PRS indicated in the first sidelink transmission and/or the second sidelink transmission. The second PRS may be transmitted to the second UE 115-*f* and the third UE 115-*g* via the sidelink communication links between the first UE 115-*e*, the second UE 115-*f*, and the third UE 115-*g*, respectively. In some aspects, the second PRS may be transmitted via the unlicensed radio frequency spectrum band.

As shown in FIG. 2, the first UE 115-*e* may transmit the second PRS to the second UE 115-*f* and the third UE 115-*g*. In this regard, the first UE 115-*e* may transmit the second PRS as a broadcast transmission, a multicast transmission, or both. In additional or alternative aspects, the first UE 115-*e* may transmit separate PRSs to the second UE 115-*f* and the third UE 115-*g*. For example, in some cases, the first UE 115-*e* may transmit the second PRS to the second UE 115-*f*, and may transmit a fourth PRS (not shown) to the third UE 115-*g*. In this regard, the first UE 115-*e* may indicate the set of resources allocated for the second PRS from the first UE 115-*e* to the second UE 115-*f* in the first sidelink transmission at 305, and may indicate a set of resources allocated for the fourth PRS (not shown) from the first UE 115-*e* to the third UE 115-*g* in the second sidelink transmission at 310. In this example, the second PRS and the fourth PRS may be transmitted as unicast transmissions.

At 330, the second UE 115-*f* and/or the third UE 115-*g* may determine composite transmission times and positions, and composite reception times and positions, associated with the respective PRSs transmitted and received by the second UE 115-*f* and the third UE 115-*g*. The second UE 115-*f* and/or the third UE 115-*f* may determine composite transmission/reception times and positions based on receiving the first sidelink transmission at 305, receiving the second sidelink transmission at 310, transmitting the first PRS at 315, transmitting the third PRS at 320, receiving the second PRS at 325, or any combination thereof.

For example, the second UE 115-*f* may determine a composite transmission time and a composite transmission position associated with transmitting the first PRS across the set of transmit antennas of the second UE 115-*f* at 315. In this regard, the second UE 115-*f* may determine when and where the first PRS was transmitted by the second UE 115-*f*. For instance, the second UE 115-*f* may determine a set of transmission times indicating a time at which the first PRS was transmitted by each transmit antenna of the set of transmit antennas. By way of example, in cases where the set of transmit antennas of the second UE 115-*f* include three transmit antennas, the second UE 115-*f* may determine a first transmit time at which the first PRS was transmitted by the first transmit antenna, a second transmit time at which the first PRS was transmitted by the second transmit antenna, and a third transmit time at which the first PRS was transmitted by the third transmit antenna. In this example, the second UE 115-*f* may determine the composite transmission time for the first PRS across the set of transmit antennas by combining the first transmit time, the second transmit time, and the third transmit time. The respective transmit times may be combined to form the composite transmission time using any mathematical operation, formula, or algorithm known in the art including, but not limited to, an average, a weighted average, an arithmetic mean, a median, or the like.

Additionally, the second UE 115-*f* may determine a composite transmission position associated with transmitting the first PRS across the set of transmit antennas of the second UE 115-*f* at 315. For example, the second UE 115-*f* may determine a set of positions associated with each transmit antenna of the set of transmit antennas. For instance, in cases where the set of transmit antennas of the second UE 115-*f* include three transmit antennas, the second UE 115-*f* may determine a first position associated with the first transmit antenna, a second position associated with the second transmit antenna, and a third position associated with the third transmit antenna. In this example, the second UE 115-*f* may determine the composite transmission position for the first PRS across the set of transmit antennas by combining the first position, the second position, and the third position. The respective positions may be combined to form the composite transmission position using any mathematical operation, formula, or algorithm known in the art including, but not limited to, an average, a weighted average, an arithmetic mean, a median, or the like.

Similarly, the second UE 115-*f* may determine a composite reception time associated with receiving the second PRS across the set of receive antennas of the second UE 115-*f* at 325. For instance, the second UE 115-*f* may determine a set of receive times indicating a time at which the second PRS was received by each receive antenna of the set of receive antennas. By way of example, in cases where the set of receive antennas of the second UE 115-*f* include three receive antennas, the second UE 115-*f* may determine a first receive time at which the second PRS was received by the first receive antenna, a second receive time at which the second PRS was received by the second receive antenna, and a third receive time at which the second PRS was received by the third receive antenna. In this example, the second UE 115-*f* may determine the composite reception time for the second PRS across the set of receive antennas by combining the first receive time, the second receive time, and the third receive time. The respective receive times may be combined to form the composite reception time using any mathematical operation, formula, or algorithm known in the art including, but not limited to, an average, a weighted average, an arithmetic mean, a median, or the like.

Additionally, the second UE 115-*f* may determine a composite reception position associated with receiving the second PRS across the set of receive antennas of the second UE 115-*f* at 325. For example, the second UE 115-*f* may determine a set of positions associated with each receive antenna of the set of receive antennas. For instance, in cases where the set of receive antennas of the second UE 115-*f* include three receive antennas, the second UE 115-*f* may determine a first receive position associated with the first receive antenna, a second receive position associated with the second receive antenna, and a third receive position associated with the third receive antenna. In this example, the second UE 115-*f* may determine the composite reception position for the second PRS across the set of receive antennas by combining the first receive position, the second receive position, and the third receive position. The respective receive positions may be combined to form the composite reception position using any mathematical operation, formula, or algorithm known in the art including, but not limited to, an average, a weighted average, an arithmetic mean, a median, or the like.

Similarly, the third UE 115-*g* may determine a composite transmission time and a composite transmission position associated with transmitting the third PRS across the set of transmit antennas of the third UE 115-*g* at 320. Moreover, the third UE 115-*g* may determine a composite reception time and a composite reception position associated with receiving the second PRS across the set of receive antennas of the third UE 115-*g* at 325. As discussed previously herein with respect to the second UE 115-*f*, the third UE 115-*g* may determine composite transmission/reception times and positions using any mathematical operation, formula, or algorithm known in the art including, but not limited to, an average, a weighted average, an arithmetic mean, a median, or the like.

At 335, the first UE 115-*e* may receive a control message from the second UE 115-*f*. In some aspects, the first UE 115-*e* may receive the control message at 335 based on (e.g., in response to) transmitting the first sidelink transmission at 305, receiving the first PRS at 315, transmitting the second PRS at 325, or any combination thereof. Additionally, the second UE 115-*g* may transmit the control message at 335 based on determining composite transmission/reception times and positions at 330. In some aspects, the control message transmitted at 335 may include an indication of a position of the second UE 115-*f*. The second UE 115-*f* may transmit the control message at 335 via the sidelink communication link between the first UE 115-*e* and the second UE 115-*f*. In some aspects, the second UE 115-*f* may transmit the control message at 335 via a licensed radio frequency spectrum band. For example, control message transmitted at 335 may include an ITS message transmitted via a licensed radio frequency spectrum band.

In some aspects, the control message may indicate time and position information associated with the first PRS transmitted by the second UE 115-*f*, the second PRS received by the second UE 115-*f*, or both. For example, the control message may indicate the composite time and position information for the first PRS transmitted using the set of transmit antennas of the second UE 115-*f*, the second PRS received using the set of receive antennas of the second UE 115-*f*, or both. For instance, the control message may include the composite transmission time associated with transmitting the first PRS across the set of transmit antennas of the second UE 115-*f* at 315, and the composite transmission position associated with transmitting the first PRS across the set of transmit antennas of the second UE 115-*f* at 315. Similarly, the control message may include the composite reception time associated with receiving the second PRS across the set of receive antennas of the second UE 115-*f* at 325, and the composite reception position associated with receiving the second PRS across the set of receive antennas of the second UE 115-*f* at 325. In this regard, the control message may include an indication of when and where the first PRS was transmitted by the second UE 115-*f*, and an indication of when and where the second PRS was received by the second UE 115-*f*.

At 340, the first UE 115-*e* may receive a control message from the third UE 115-*g*. In some aspects, the first UE 115-*e* may receive the control message at 340 based on (e.g., in response to) transmitting the second sidelink transmission at 310, receiving the third PRS at 320, transmitting the second PRS at 325, or any combination thereof. Additionally, the third UE 115-*g* may transmit the control message at 340 based on determining composite transmission/reception times and positions at 330. In some aspects, the control message transmitted at 340 may include an indication of a position of the third UE 115-*g*. The third UE 115-*g* may transmit the control message at 340 via the sidelink communication link between the first UE 115-*e* and the third UE 115-*g*. In some aspects, the third UE 115-*g* may transmit the control message at 340 via a licensed radio frequency spectrum band. For example, control message transmitted at 340 may include an ITS message transmitted via a licensed radio frequency spectrum band.

In some aspects, the control message may indicate time and position information associated with the third PRS transmitted by the third UE 115-*g*, the second PRS received by the third UE 115-*g*, or both. For example, the control message may indicate the composite time and position information for the third PRS transmitted using the set of transmit antennas of the third UE 115-*g*, the second PRS received using the set of receive antennas of the third UE 115-*g*, or both. For instance, the control message may include the composite transmission time associated with transmitting the third PRS across the set of transmit antennas of the third UE 115-*g* at 320, and the composite transmission position associated with transmitting the third PRS across the set of transmit antennas of the third UE 115-*g* at 320. Similarly, the control message may include the composite reception time associated with receiving the second PRS across the set of receive antennas of the third UE 115-*g* at 325, and the composite reception position associated with receiving the second PRS across the set of receive antennas of the third UE 115-*g* at 325. In this regard, the control message may include an indication of when and where the third PRS was transmitted by the third UE 115-*g*, and an indication of when and where the second PRS was received by the third UE 115-*g*.

At 345, the first UE 115-*e* may determine composite transmission times and positions associated with transmitting the second PRS at 325, and composite reception times and positions associated with receiving first PRS at 315 and the third PRS at 320. In some aspects, the first UE 115-*e* may determine composite transmission/reception times and positions based on transmitting the first sidelink transmission at 305, transmitting the second sidelink transmission at 310, receiving the first PRS at 315, receiving the third PRS at 320, transmitting the second PRS at 325, receiving the control messages at 335 and 340, or any combination thereof.

For example, the first UE 115-*e* may determine a composite transmission time and a composite transmission position associated with transmitting the second PRS across the set of transmit antennas of the first UE 115-*e* at 325. Similarly, the first UE 115-*e* may determine a composite reception time and a composite reception position associated with receiving the first PRS across the set of receive antennas of the first UE 115-*e* at 315. Moreover, the first UE 115-*e* may determine a composite reception time and a composite reception position associated with receiving the third PRS across the set of receive antennas of the first UE 115-*e* at 320. As discussed previously herein with respect to the second UE 115-*f* and the third UE 115-*g*, the first UE 115-*e* may determine composite transmission/reception times and positions using any mathematical operation, formula, or algorithm known in the art including, but not limited to, an average, a weighted average, an arithmetic mean, a median, or the like.

At 350, the first UE 115-*e* may determine propagation times associated with the first PRS, the second PRS transmitted to the second UE 115-*f*, the second PRS transmitted to the third UE 115-*g*, the third PRS, or any combination thereof. In some aspects, the first UE 115-*e* may determine the propagation times of the respective PRSs based on the control message received at 335, the control message received at 340, determining the composite transmission/reception times and positions at 345, or any combination thereof.

For example, the first UE 115-*e* may determine the propagation times at 350 based on the composite time and position information for the first PRS transmitted by the second UE 115-*f*, composite time and position information for the first PRS received by the first UE 115-*e*, composite time and position information for the third PRS transmitted by the third UE 115-*g*, composite time and position information for the third PRS received by the first UE 115-*e*, composite time and position information for the second PRS transmitted by the first UE 115-*e*, composite time and position information for the second PRS received by the second UE 115-*f*, composite time and position information for the second PRS received by the third UE 115-*g*, or any combination thereof.

For instance, the first UE 115-*e* may determine a first propagation time associated with the first PRS based on the composite transmission time associated with transmitting the first PRS by second UE 115-*f* at 315, and a composite reception time associated with receiving the first PRS by the first UE 115-*e* at 315. By way of another example, the first UE 115-*e* may determine a second propagation time associated with the second PRS based on the composite transmission time associated with transmitting the first PRS by first UE 115-*e* at 325, and a composite reception time associated with receiving the second PRS by the second UE 115-*f* at 325.

At 355, the first UE 115-*e* may estimate a clock calibration error associated with the set of receive antennas of the first UE 115-*e*, the set of transmit antennas of the first UE 115-*e*, or both. In some aspects, the first UE 115-*e* may estimate the clock calibration error based on the control messages received at 335 and/or 340, determining the composite transmission/reception times and positions at 345, or any combination thereof.

In some aspects, determining composite transmission and reception times may significantly simplify the estimation of clock calibration errors. For example, in some conventional sidelink positioning procedures, a multi-antenna UE may have to estimate a clock calibration error for each individual transmit antenna and receive antenna. This may result in significant computational cost and power consumption. Comparatively, by determining composite transmission and reception times for transmitting and receiving PRSs, techniques described herein may reduce the quantity of clock calibration errors which may be calculated. Moreover, the quantity of clock calibration errors may be fixed, and may require fewer data samples for convergence of the clock calibration errors as compared to some conventional sidelink positioning procedures.

At 360, the first UE 115-*e* may determine a position of the first UE 115-*e*. In some aspects, the first UE 115-*e* may determine the position of the first UE 115-*e* based on the control messages received at 335 and/or 340, the composite transmission/reception times and positions determined at 345, the propagation times determined at 350, the clock calibration error(s) estimated at 355, or any combination thereof. Additionally or alternatively, the first UE 115-*e* may determine the position of the first UE1 115-*e* based on the indications of the positions of the second UE 115-*f* and the third UE 115-*g* indicated in the control messages received at 335 and 340, respectively. In some aspects, the first UE 115-*e* may determine the position of the first UE 115-*e* at 360 based on a propagation speed, or an estimated propagation speed, of the PRSs (e.g., the speed of light).

For example, the first UE 115-*e* may determine the position of the first UE 115-*e* based on the composite time and position information for the first PRS transmitted by the second UE 115-*f*, the composite time and position information for the first PRS received by the first UE 115-*e*, the composite time and position information for the second PRS transmitted by the first UE 115-*e*, and the composite time and position information for the second PRS received by the second UE 115-*f* For instance, the first UE 115-*e* may determine the position of the first UE 115-*e* based on the position of the second UE 115-*f*, the first propagation time associated with the first PRS from the second UE 115-*f* to the first UE 115-*e*, the second propagation time associated with the second PRS from the first UE 115-*e* to the second UE 115-*f*, or any combination thereof.

Techniques described herein may enable the first UE 115-*e* to perform sidelink positioning procedures to more accurately determine a position of the first UE 115-*e*. In particular, by determining composite time and position information across the sets of antennas, the UE 115-*e* may perform sidelink positioning without having to signal and compute individual transmit/receive times and positions for each individual transmit antenna and receive antenna. Accordingly, techniques described herein may significantly reduce the complexity of sidelink positioning procedures, and reduce the computational cost of sidelink positioning procedures within wireless communications systems (e.g., wireless communications systems 100 or 200).

Figure 4:
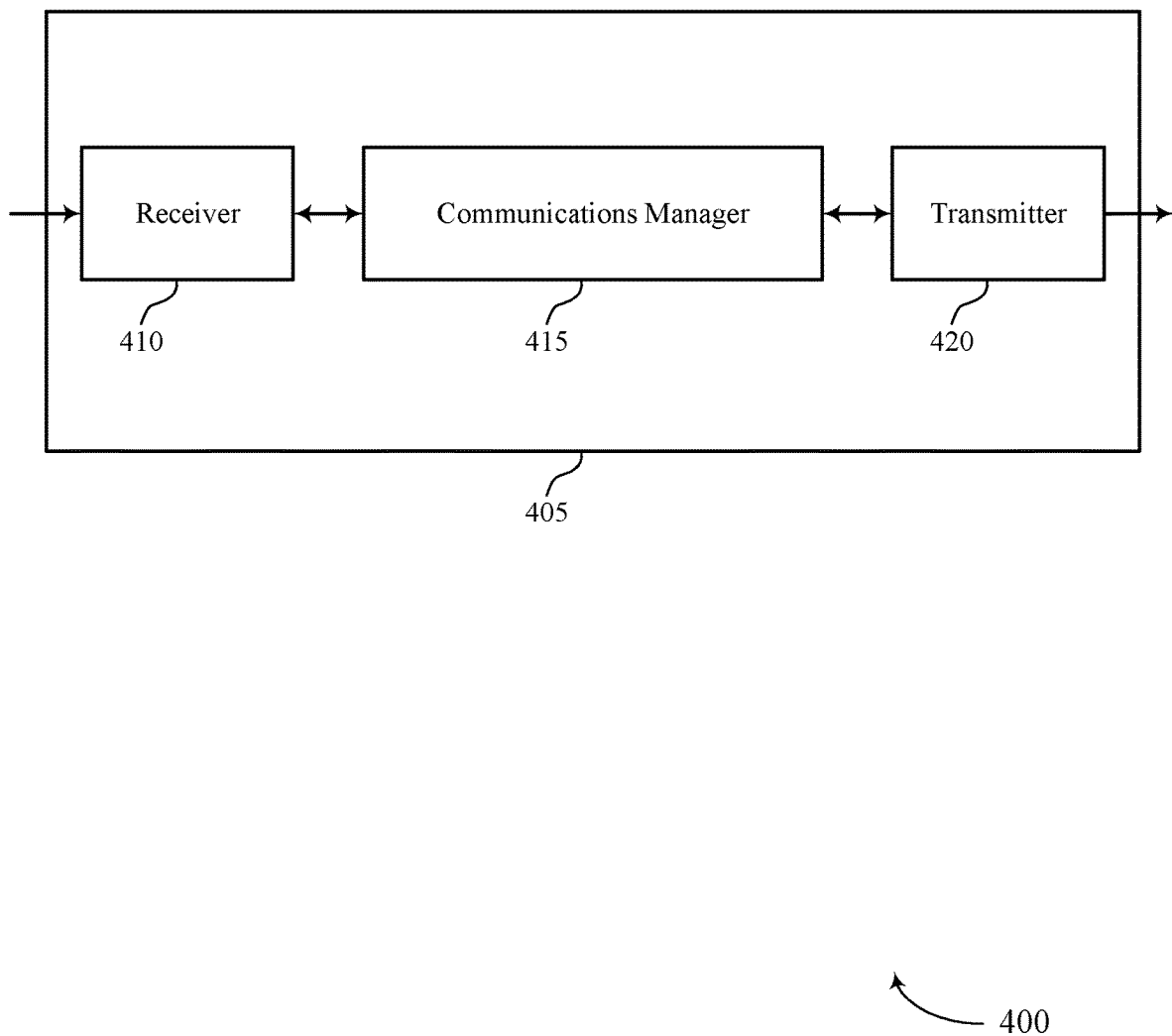
FIGS. 4 and 5 show block diagrams of devices that support techniques for determining position over sidelink using multiple antennas in accordance with aspects of the present disclosure.

FIG. 4 shows a block diagram 400 of a device 405 that supports techniques for determining position over sidelink using multiple antennas in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to techniques for determining position over sidelink using multiple antennas, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive, using a set of receive antennas, a first PRS, transmit, using a set of transmit antennas in response to the received first PRS, a second PRS, the set of transmit antennas or the set of receive antennas, or both, including a set of antennas, receive, from a second UE, a control message indicating time and position information for the first PRS transmitted by the second UE and for the second PRS received at the second UE, and determine a position of the first UE based on the received control message and composite time and position information for the first PRS received at the first UE and for the second PRS transmitted by the first UE. The communications manager 415 may also transmit, using a set of transmit antennas, a first PRS, receive, using a set of receive antennas in response to the transmitted first PRS, a second PRS, the set of transmit antennas, the set of receive antennas, or both, including a set of antennas, and transmit, to a first UE, a control message indicating composite time and position information for the first PRS transmitted using the set of transmit antennas and for the second PRS received using the set of receive antennas. The communications manager 415 may be an example of aspects of the communications manager 710 described herein.

The actions performed by the communications manager 415 as described herein may be implemented to realize one or more potential advantages. For example, by determining composite time and position information across the sets of antennas, the communications manager 415 may perform sidelink positioning without having to signal and compute individual transmit/receive times and positions for each individual transmit antenna and receive antenna. Moreover, by determining composite time and position information across the sets of antennas, times and positions associated with each respective transmit antenna and receive antenna may not be signaled individually, thereby alleviating network overhead and reducing control signaling required to perform sidelink positioning procedures.

Based on determining composite time and position information across the sets of antennas, a processor of the UE 115 (e.g., a processor controlling the receiver 410, the communications manager 415, the transmitter 420, etc.) may reduce processing resources used for sidelink positioning procedures. For example, by determining composite time and position information across the sets of antennas, the computational cost and complexity associated with sidelink positioning procedures may be significantly reduced, thereby reducing processing resources and reducing power consumption.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
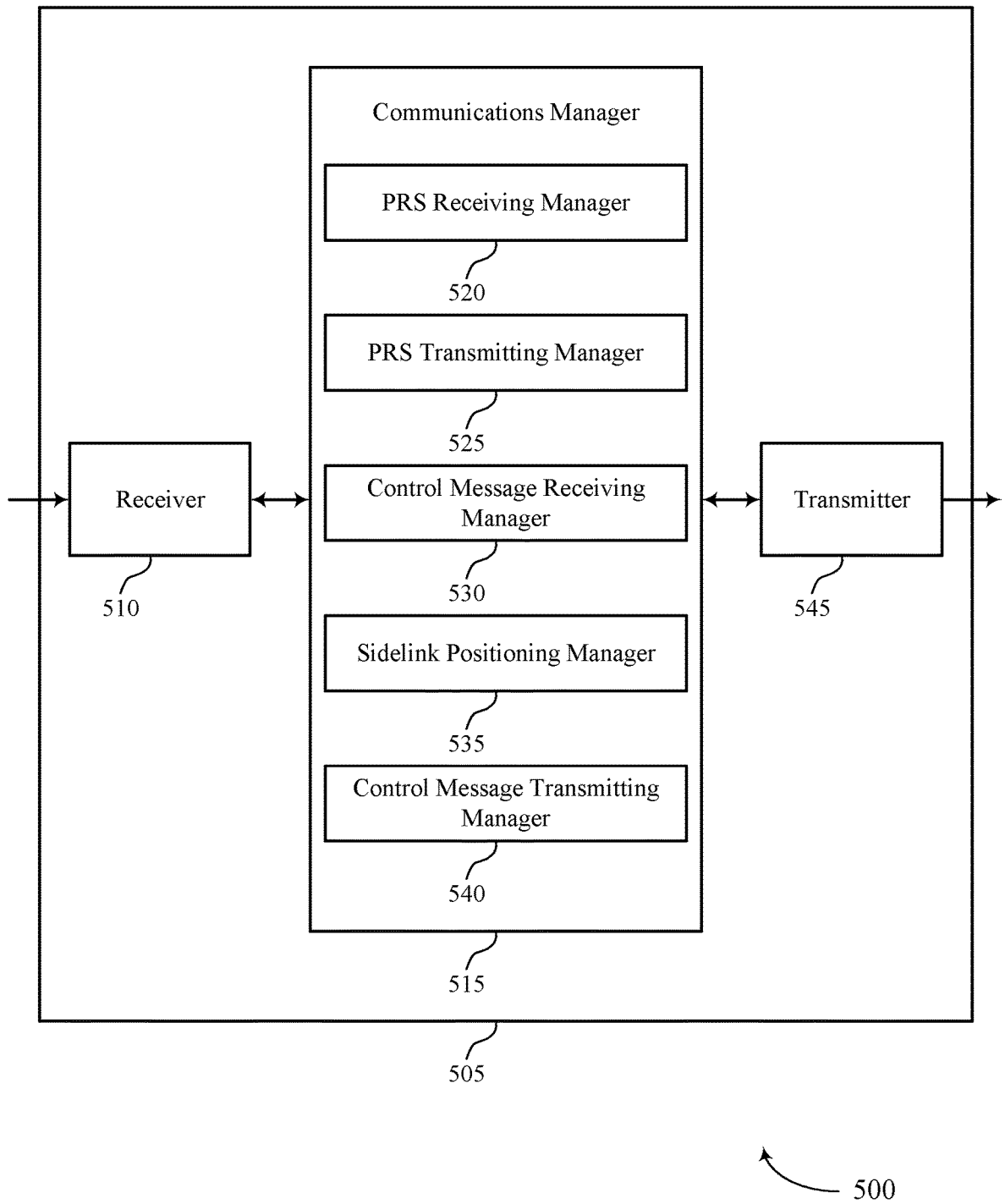

FIG. 5 shows a block diagram 500 of a device 505 that supports techniques for determining position over sidelink using multiple antennas in accordance with aspects of the present disclosure. The device 505 may be an example of aspects of a device 405, or a UE 115 as described herein. The device 505 may include a receiver 510, a communications manager 515, and a transmitter 545. The device 505 may also include a processor. Each of these components may be in communication with one another (e.g., via one or more buses).

The receiver 510 may receive information such as packets, user data, or control information associated with various information channels (e.g., control channels, data channels, and information related to techniques for determining position over sidelink using multiple antennas, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a PRS receiving manager 520, a PRS transmitting manager 525, a control message receiving manager 530, a sidelink positioning manager 535, and a control message transmitting manager 540. The communications manager 515 may be an example of aspects of the communications manager 710 described herein.

The PRS receiving manager 520 may receive, using a set of receive antennas, a first PRS.

The PRS transmitting manager 525 may transmit, using a set of transmit antennas in response to the received first PRS, a second PRS, the set of transmit antennas or the set of receive antennas, or both, including a set of antennas.

The control message receiving manager 530 may receive, from a second UE, a control message indicating time and position information for the first PRS transmitted by the second UE and for the second PRS received at the second UE.

The sidelink positioning manager 535 may determine a position of the first UE based on the received control message and composite time and position information for the first PRS received at the first UE and for the second PRS transmitted by the first UE.

The PRS transmitting manager 525 may transmit, using a set of transmit antennas, a first PRS.

The PRS receiving manager 520 may receive, using a set of receive antennas in response to the transmitted first PRS, a second PRS, the set of transmit antennas, the set of receive antennas, or both, including a set of antennas.

The control message transmitting manager 540 may transmit, to a first UE, a control message indicating composite time and position information for the first PRS transmitted using the set of transmit antennas and for the second PRS received using the set of receive antennas.

The transmitter 545 may transmit signals generated by other components of the device 505. In some examples, the transmitter 545 may be collocated with a receiver 510 in a transceiver module. For example, the transmitter 545 may be an example of aspects of the transceiver 720 described with reference to FIG. 7. The transmitter 545 may utilize a single antenna or a set of antennas.

Figure 6:
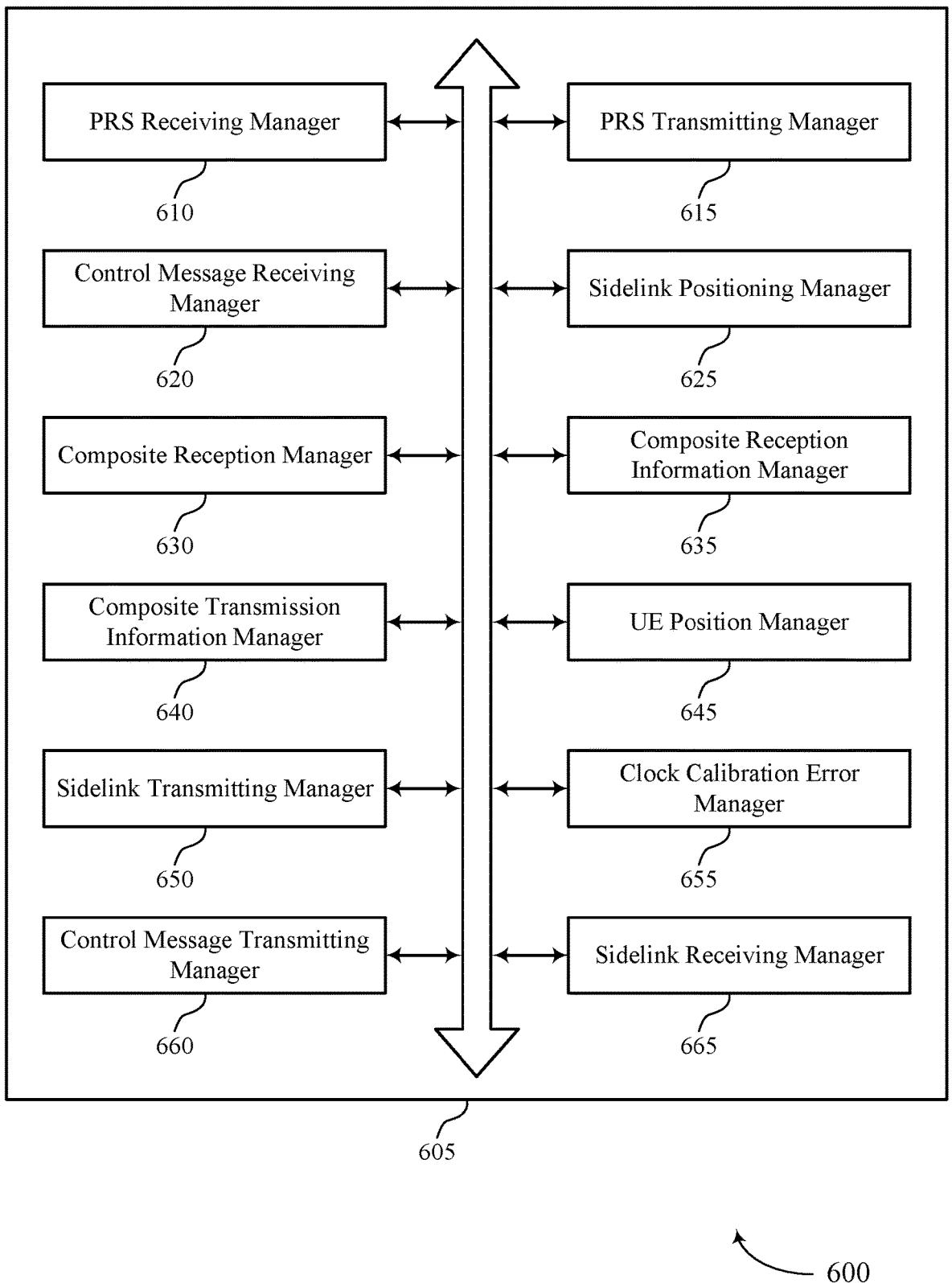
FIG. 6 shows a block diagram of a communications manager that supports techniques for determining position over sidelink using multiple antennas in accordance with aspects of the present disclosure.

FIG. 6 shows a block diagram 600 of a communications manager 605 that supports techniques for determining position over sidelink using multiple antennas in accordance with aspects of the present disclosure. The communications manager 605 may be an example of aspects of a communications manager 415, a communications manager 515, or a communications manager 710 described herein. The communications manager 605 may include a PRS receiving manager 610, a PRS transmitting manager 615, a control message receiving manager 620, a sidelink positioning manager 625, a composite reception manager 630, a composite reception information manager 635, a composite transmission information manager 640, a UE position manager 645, a sidelink transmitting manager 650, a clock calibration error manager 655, a control message transmitting manager 660, and a sidelink receiving manager 665. Each of these modules may communicate, directly or indirectly, with one another (e.g., via one or more buses).

The PRS receiving manager 610 may receive, using a set of receive antennas, a first PRS. In some examples, the PRS receiving manager 610 may receive, using a set of receive antennas in response to the transmitted first PRS, a second PRS, the set of transmit antennas, the set of receive antennas, or both, including a set of antennas. In some examples, the PRS receiving manager 610 may receive the third PRS from the third UE using the set of receive antennas in response to the second sidelink transmission. In some cases, the set of receive antennas includes one receive antenna. In some cases, the set of receive antennas includes a set of receive antennas.

The PRS transmitting manager 615 may transmit, using a set of transmit antennas in response to the received first PRS, a second PRS, the set of transmit antennas or the set of receive antennas, or both, including a set of antennas. In some examples, the PRS transmitting manager 615 may transmit, using a set of transmit antennas, a first PRS. In some examples, the PRS transmitting manager 615 may transmit the second PRS to the third UE using the set of transmit antennas in response to the received third PRS. In some cases, the set of transmit antennas includes one transmit antenna. In some cases, the set of transmit antennas includes a set of transmit antennas.

In some cases, the first PRS, the second PRS, or both, are transmitted via an unlicensed radio frequency spectrum band, and where the control message is transmitted via a licensed radio frequency spectrum band. In some cases, the first PRS, the second PRS, the control message, or a combination thereof, is transmitted via a sidelink communication link between the first UE and the second UE.

The control message receiving manager 620 may receive, from a second UE, a control message indicating time and position information for the first PRS transmitted by the second UE and for the second PRS received at the second UE. In some examples, the control message receiving manager 620 may receive, via the control message, an indication of a position of the second UE, where determining the position of the first UE is based on the indication of the position of the second UE. In some examples, the control message receiving manager 620 may receive, from the third UE, an additional control message indicating time and position information for the third PRS transmitted by the third UE, and time and position information for the second PRS received at the third UE, where determining the position of the first UE is based on the additional control message received from the third UE. In some cases, the control message received from the second UE includes an intelligent transportation system message.

The sidelink positioning manager 625 may determine a position of the first UE based on the received control message and composite time and position information for the first PRS received at the first UE and for the second PRS transmitted by the first UE. In some examples, the sidelink positioning manager 625 may determine the position of the of the first UE based on the position of the second UE, the first propagation time, the second propagation time, or any combination thereof.

The control message transmitting manager 660 may transmit, to a first UE, a control message indicating composite time and position information for the first PRS transmitted using the set of transmit antennas and for the second PRS received using the set of receive antennas. In some examples, the control message transmitting manager 660 may transmit, via the control message, an indication of a position of the second UE. In some cases, the control message transmitted to the first UE includes an intelligent transportation system message.

The composite reception manager 630 may determine a composite reception time and a composite reception position associated with receiving the first PRS across the set of receive antennas, where the composite time and position information is based on the composite reception time and the composite reception position. The composite reception information manager 635 may determine, for each receive antenna of the set of receive antennas, a time at which the first PRS was received at the receive antenna and a position of the receive antenna. In some examples, the composite reception information manager 635 may determine an average time, a weighted average time, or an arithmetic mean time for the first PRS. In some examples, the composite reception information manager 635 may determine an average position, a weighted average position, or an arithmetic mean position for the set of receive antennas associated with the first PRS. In some examples, the composite reception information manager 635 may determine a composite reception time and a composite reception position associated with receiving the second PRS across the set of receive antennas, where the composite time and position information is based on the composite reception time and the composite reception position.

In some examples, the composite reception information manager 635 may determine, for each receive antenna of the set of receive antennas, a time at which the second PRS was received at the receive antenna and a position of the receive antenna. In some examples, the composite reception information manager 635 may determine an average time, a weighted average time, or an arithmetic mean time for the second PRS. In some examples, the composite reception information manager 635 may determine an average position, a weighted average position, or an arithmetic mean position for the set of receive antennas associated with the second PRS.

The composite transmission information manager 640 may determine a composite transmission time and a composite transmission position associated with transmitting the second PRS across the set of transmit antennas, where the composite time and position information is based on the composite transmission time and the composite transmission position. In some examples, the composite transmission information manager 640 may determine a set of transmission times indicating a time at which the second PRS was transmitted by each transmit antenna of the set of transmit antennas. In some examples, the composite transmission information manager 640 may determine an average time, a weighted average time, or an arithmetic mean time for the second PRS. In some examples, the composite transmission information manager 640 may determine an average position, a weighted average position, or an arithmetic mean position for the set of transmit antennas associated with the second PRS.

In some examples, the composite transmission information manager 640 may determine a composite transmission time and a composite transmission position associated with transmitting the first PRS across the set of transmit antennas, where the composite time and position information is based on the composite transmission time and the composite transmission position. In some examples, the composite transmission information manager 640 may determine a set of transmission times indicating a time at which the first PRS was transmitted by each transmit antenna of the set of transmit antennas. In some examples, the composite transmission information manager 640 may determine an average time, a weighted average time, or an arithmetic mean time for the first PRS.

In some examples, the composite transmission information manager 640 may determine an average position, a weighted average position, or an arithmetic mean position for the set of transmit antennas associated with the first PRS.

The UE position manager 645 may determine a first propagation time associated with the first PRS, a second propagation time associated with the second PRS, or both, based on the received control message and the composite time and position information for the first PRS received at the first UE and for the second PRS transmitted by the first UE. In some cases, the first UE includes a first vehicle, and where the second UE includes a second vehicle or a roadside unit.

The sidelink transmitting manager 650 may transmit, to the second UE, a first sidelink transmission including an indication of a first set of resources allocated for the first PRS, a second set of resources allocated for the second PRS, or both. In some examples, the sidelink transmitting manager 650 may transmit, to a third UE, a second sidelink transmission including an indication of a third set of resources allocated for a third PRS, the second set of resources allocated for the second PRS, or both.

The clock calibration error manager 655 may estimate a clock calibration error associated with the set of receive antennas, the set of transmit antennas, or both, based on the control message received from the second UE, where determining the position of the first UE is based on the estimated clock calibration error.

The sidelink receiving manager 665 may receive, from the first UE, a first sidelink transmission including an indication of a first set of resources allocated for the first PRS, a second set of resources allocated for the second PRS, or both.

Figure 7:
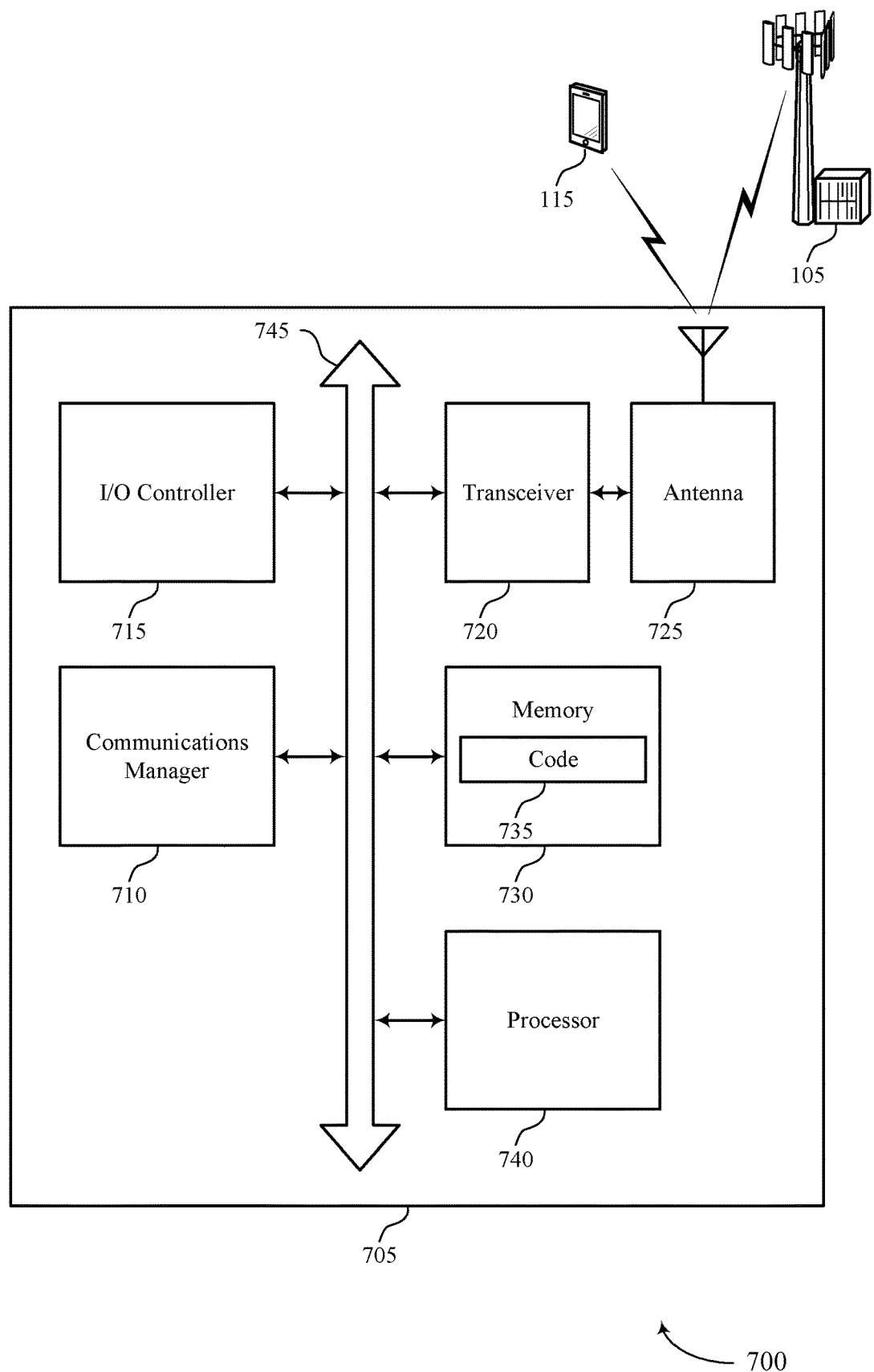
FIG. 7 shows a diagram of a system including a device that supports techniques for determining position over sidelink using multiple antennas in accordance with aspects of the present disclosure.

FIG. 7 shows a diagram of a system 700 including a device 705 that supports techniques for determining position over sidelink using multiple antennas in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive, using a set of receive antennas, a first PRS, transmit, using a set of transmit antennas in response to the received first PRS, a second PRS, the set of transmit antennas or the set of receive antennas, or both, including a set of antennas, receive, from a second UE, a control message indicating time and position information for the first PRS transmitted by the second UE and for the second PRS received at the second UE, and determine a position of the first UE based on the received control message and composite time and position information for the first PRS received at the first UE and for the second PRS transmitted by the first UE. The communications manager 710 may also transmit, using a set of transmit antennas, a first PRS, receive, using a set of receive antennas in response to the transmitted first PRS, a second PRS, the set of transmit antennas, the set of receive antennas, or both, including a set of antennas, and transmit, to a first UE, a control message indicating composite time and position information for the first PRS transmitted using the set of transmit antennas and for the second PRS received using the set of receive antennas.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for determining position over sidelink using multiple antennas).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
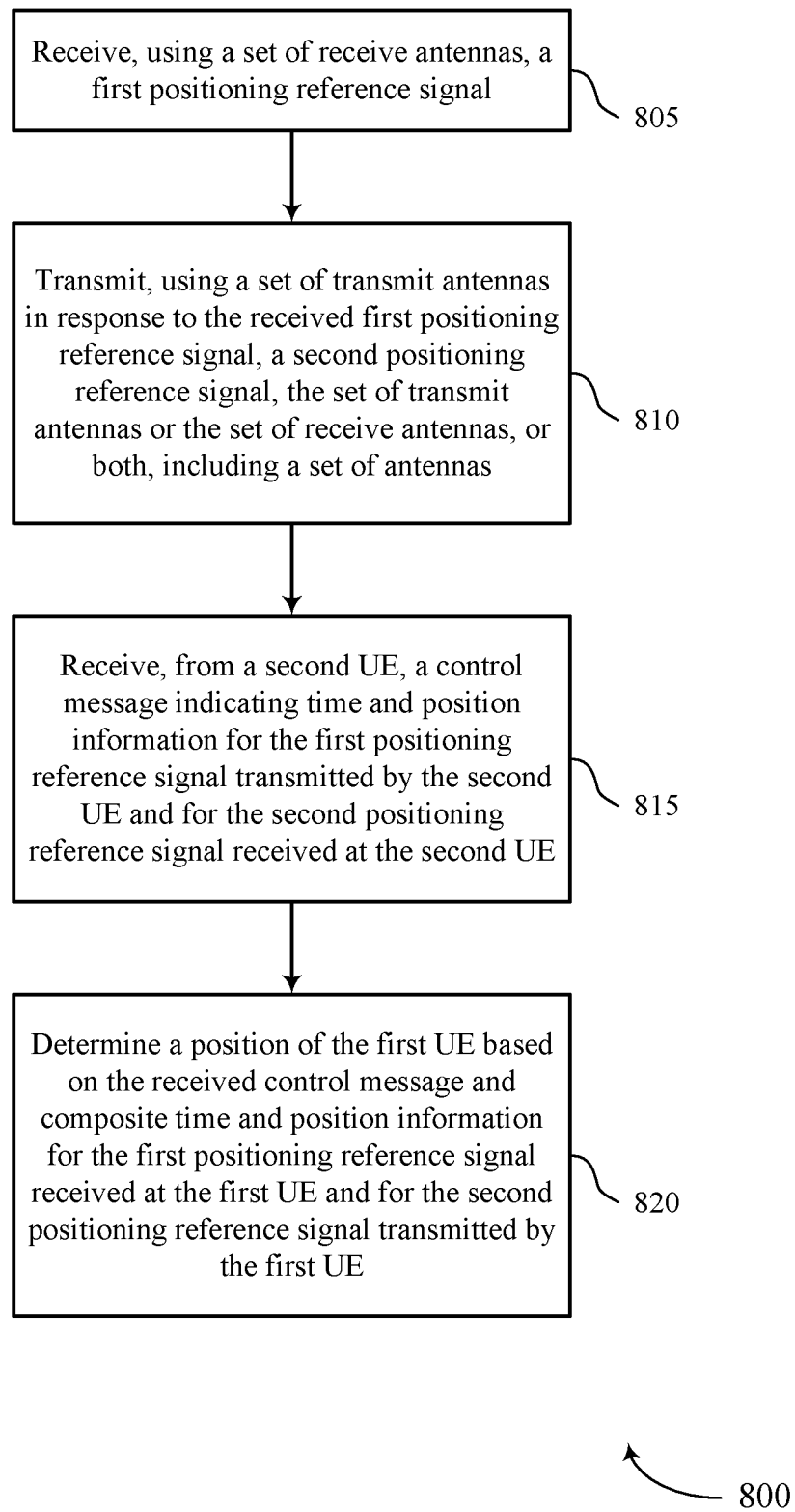
FIGS. 8 through 11 show flowcharts illustrating methods that support techniques for determining position over sidelink using multiple antennas in accordance with aspects of the present disclosure.

FIG. 8 shows a flowchart illustrating a method 800 that supports techniques for determining position over sidelink using multiple antennas in accordance with aspects of the present disclosure. The operations of method 800 may be implemented by a UE 115 or its components as described herein. For example, the operations of method 800 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 805, the UE may receive, using a set of receive antennas, a first PRS. The operations of 805 may be performed according to the methods described herein. In some examples, aspects of the operations of 805 may be performed by a PRS receiving manager as described with reference to FIGS. 4 through 7.

At 810, the UE may transmit, using a set of transmit antennas in response to the received first PRS, a second PRS, the set of transmit antennas or the set of receive antennas, or both, including a set of antennas. The operations of 810 may be performed according to the methods described herein. In some examples, aspects of the operations of 810 may be performed by a PRS transmitting manager as described with reference to FIGS. 4 through 7.

At 815, the UE may receive, from a second UE, a control message indicating time and position information for the first PRS transmitted by the second UE and for the second PRS received at the second UE. The operations of 815 may be performed according to the methods described herein. In some examples, aspects of the operations of 815 may be performed by a control message receiving manager as described with reference to FIGS. 4 through 7.

At 820, the UE may determine a position of the first UE based on the received control message and composite time and position information for the first PRS received at the first UE and for the second PRS transmitted by the first UE. The operations of 820 may be performed according to the methods described herein. In some examples, aspects of the operations of 820 may be performed by a sidelink positioning manager as described with reference to FIGS. 4 through 7.

Figure 9:
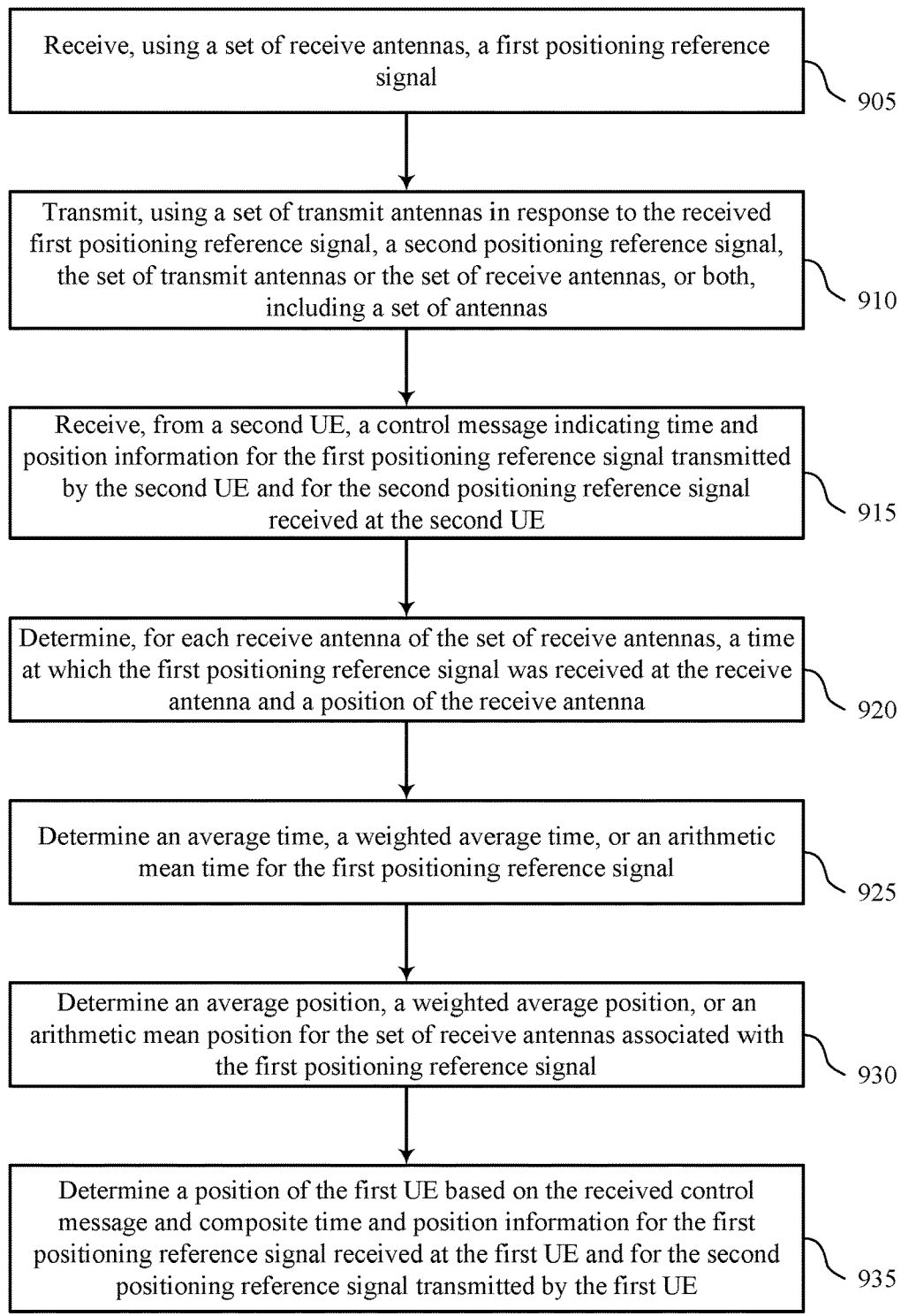

FIG. 9 shows a flowchart illustrating a method 900 that supports techniques for determining position over sidelink using multiple antennas in accordance with aspects of the present disclosure. The operations of method 900 may be implemented by a UE 115 or its components as described herein. For example, the operations of method 900 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 905, the UE may receive, using a set of receive antennas, a first PRS. The operations of 905 may be performed according to the methods described herein. In some examples, aspects of the operations of 905 may be performed by a PRS receiving manager as described with reference to FIGS. 4 through 7.

At 910, the UE may transmit, using a set of transmit antennas in response to the received first PRS, a second PRS, the set of transmit antennas or the set of receive antennas, or both, including a set of antennas. The operations of 910 may be performed according to the methods described herein. In some examples, aspects of the operations of 910 may be performed by a PRS transmitting manager as described with reference to FIGS. 4 through 7.

At 915, the UE may receive, from a second UE, a control message indicating time and position information for the first PRS transmitted by the second UE and for the second PRS received at the second UE. The operations of 915 may be performed according to the methods described herein. In some examples, aspects of the operations of 915 may be performed by a control message receiving manager as described with reference to FIGS. 4 through 7.

At 920, the UE may determine, for each receive antenna of the set of receive antennas, a time at which the first PRS was received at the receive antenna and a position of the receive antenna. The operations of 920 may be performed according to the methods described herein. In some examples, aspects of the operations of 920 may be performed by a composite reception information manager as described with reference to FIGS. 4 through 7.

At 925, the UE may determine an average time, a weighted average time, or an arithmetic mean time for the first PRS. The operations of 925 may be performed according to the methods described herein. In some examples, aspects of the operations of 925 may be performed by a composite reception information manager as described with reference to FIGS. 4 through 7.

At 930, the UE may determine an average position, a weighted average position, or an arithmetic mean position for the set of receive antennas associated with the first PRS. The operations of 930 may be performed according to the methods described herein. In some examples, aspects of the operations of 930 may be performed by a composite reception information manager as described with reference to FIGS. 4 through 7.

At 935, the UE may determine a position of the first UE based on the received control message and composite time and position information for the first PRS received at the first UE and for the second PRS transmitted by the first UE. The operations of 935 may be performed according to the methods described herein. In some examples, aspects of the operations of 935 may be performed by a sidelink positioning manager as described with reference to FIGS. 4 through 7.

Figure 10:
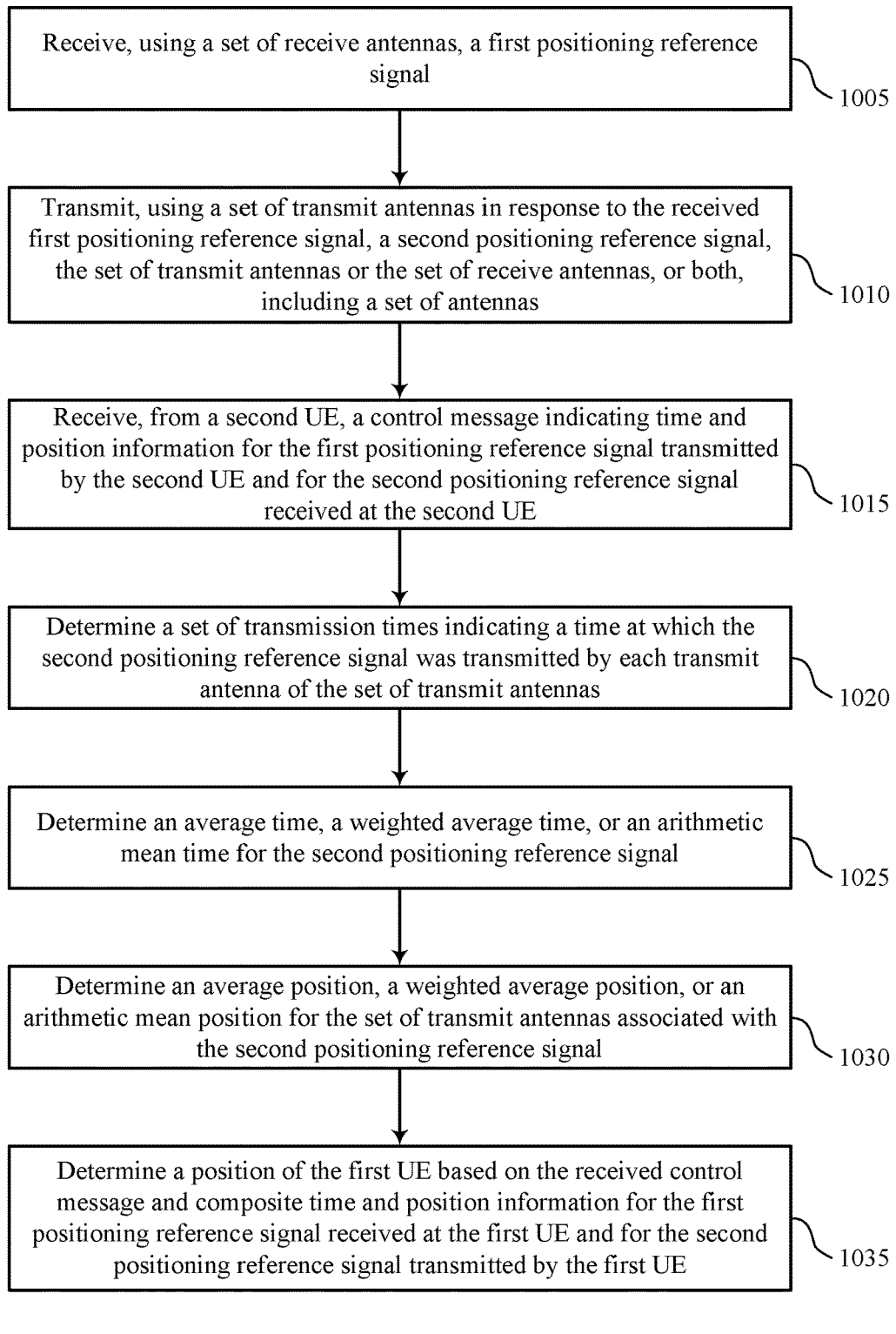

FIG. 10 shows a flowchart illustrating a method 1000 that supports techniques for determining position over sidelink using multiple antennas in accordance with aspects of the present disclosure. The operations of method 1000 may be implemented by a UE 115 or its components as described herein. For example, the operations of method 1000 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1005, the UE may receive, using a set of receive antennas, a first PRS. The operations of 1005 may be performed according to the methods described herein. In some examples, aspects of the operations of 1005 may be performed by a PRS receiving manager as described with reference to FIGS. 4 through 7.

At 1010, the UE may transmit, using a set of transmit antennas in response to the received first PRS, a second PRS, the set of transmit antennas or the set of receive antennas, or both, including a set of antennas. The operations of 1010 may be performed according to the methods described herein. In some examples, aspects of the operations of 1010 may be performed by a PRS transmitting manager as described with reference to FIGS. 4 through 7.

At 1015, the UE may receive, from a second UE, a control message indicating time and position information for the first PRS transmitted by the second UE and for the second PRS received at the second UE. The operations of 1015 may be performed according to the methods described herein. In some examples, aspects of the operations of 1015 may be performed by a control message receiving manager as described with reference to FIGS. 4 through 7.

At 1020, the UE may determine a set of transmission times indicating a time at which the second PRS was transmitted by each transmit antenna of the set of transmit antennas. The operations of 1020 may be performed according to the methods described herein. In some examples, aspects of the operations of 1020 may be performed by a composite transmission information manager as described with reference to FIGS. 4 through 7.

At 1025, the UE may determine an average time, a weighted average time, or an arithmetic mean time for the second PRS. The operations of 1025 may be performed according to the methods described herein. In some examples, aspects of the operations of 1025 may be performed by a composite transmission information manager as described with reference to FIGS. 4 through 7.

At 1030, the UE may determine an average position, a weighted average position, or an arithmetic mean position for the set of transmit antennas associated with the second PRS. The operations of 1030 may be performed according to the methods described herein. In some examples, aspects of the operations of 1030 may be performed by a composite transmission information manager as described with reference to FIGS. 4 through 7.

At 1035, the UE may determine a position of the first UE based on the received control message and composite time and position information for the first PRS received at the first UE and for the second PRS transmitted by the first UE. The operations of 1035 may be performed according to the methods described herein. In some examples, aspects of the operations of 1035 may be performed by a sidelink positioning manager as described with reference to FIGS. 4 through 7.

Figure 11:
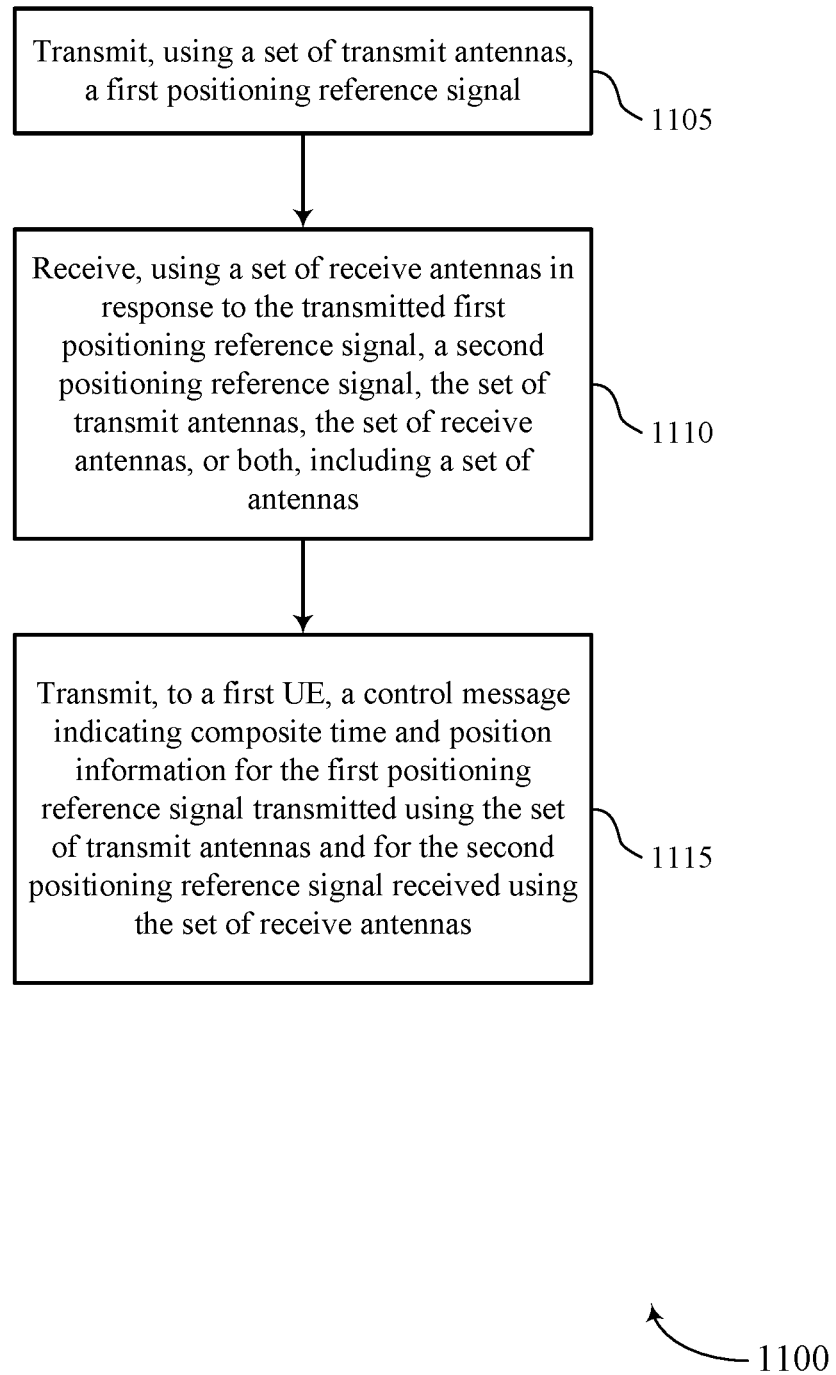

FIG. 11 shows a flowchart illustrating a method 1100 that supports techniques for determining position over sidelink using multiple antennas in accordance with aspects of the present disclosure. The operations of method 1100 may be implemented by a UE 115 or its components as described herein. For example, the operations of method 1100 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1105, the UE may transmit, using a set of transmit antennas, a first PRS. The operations of 1105 may be performed according to the methods described herein. In some examples, aspects of the operations of 1105 may be performed by a PRS transmitting manager as described with reference to FIGS. 4 through 7.

At 1110, the UE may receive, using a set of receive antennas in response to the transmitted first PRS, a second PRS, the set of transmit antennas, the set of receive antennas, or both, including a set of antennas. The operations of 1110 may be performed according to the methods described herein. In some examples, aspects of the operations of 1110 may be performed by a PRS receiving manager as described with reference to FIGS. 4 through 7.

At 1115, the UE may transmit, to a first UE, a control message indicating composite time and position information for the first PRS transmitted using the set of transmit antennas and for the second PRS received using the set of receive antennas. The operations of 1115 may be performed according to the methods described herein. In some examples, aspects of the operations of 1115 may be performed by a control message transmitting manager as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a first UE, comprising: receiving, using a set of receive antennas, a first PRS; transmitting, using a set of transmit antennas in response to the received first PRS, a second PRS, the set of transmit antennas or the set of receive antennas, or both, comprising a plurality of antennas; receiving, from a second UE, a control message indicating time and position information for the first PRS transmitted by the second UE and for the second PRS received at the second UE; and determining a position of the first UE based at least in part on the received control message and composite time and position information for the first PRS received at the first UE and for the second PRS transmitted by the first UE.

Aspect 2: The method of aspect 1, further comprising: determining a composite reception time and a composite reception position associated with receiving the first PRS across the set of receive antennas, wherein the composite time and position information is based at least in part on the composite reception time and the composite reception position.

Aspect 3: The method of aspect 2, wherein determining the composite reception time and the composite reception position associated with receiving the first PRS across the set of receive antennas comprises: determining, for each receive antenna of the set of receive antennas, a time at which the first PRS was received at the receive antenna and a position of the receive antenna; determining an average time, a weighted average time, or an arithmetic mean time for the first PRS; and determining an average position, a weighted average position, or an arithmetic mean position for the set of receive antennas associated with the first PRS.

Aspect 4: The method of any of aspects 2 through 3, wherein the set of receive antennas comprises one receive antenna.

Aspect 5: The method of any of aspects 2 through 4, wherein the set of receive antennas comprises a plurality of receive antennas.

Aspect 6: The method of any of aspects 1 through 5, further comprising: determining a composite transmission time and a composite transmission position associated with transmitting the second PRS across the set of transmit antennas, wherein the composite time and position information is based at least in part on the composite transmission time and the composite transmission position.

Aspect 7: The method of aspect 6, wherein determining the composite transmission time and the composite transmission position associated with transmitting the second PRS across the set of transmit antennas comprises: determining a set of transmission times indicating a time at which the second PRS was transmitted by each transmit antenna of the set of transmit antennas; determining an average time, a weighted average time, or an arithmetic mean time for the second PRS; and determining an average position, a weighted average position, or an arithmetic mean position for the set of transmit antennas associated with the second PRS.

Aspect 8: The method of any of aspects 6 through 7, wherein the set of transmit antennas comprises one transmit antenna.

Aspect 9: The method of any of aspects 6 through 8, wherein the set of transmit antennas comprises a plurality of transmit antennas.

Aspect 10: The method of any of aspects 1 through 9, further comprising: receiving, via the control message, an indication of a position of the second UE, wherein determining the position of the first UE is based at least in part on the indication of the position of the second UE.

Aspect 11: The method of aspect 10, further comprising: determining a first propagation time associated with the first PRS, a second propagation time associated with the second PRS, or both, based at least in part on the received control message and the composite time and position information for the first PRS received at the first UE and for the second PRS transmitted by the first UE; and determining the position of the of the first UE based at least in part on the position of the second UE, the first propagation time, the second propagation time, or any combination thereof.

Aspect 12: The method of any of aspects 1 through 11, further comprising: transmitting, to the second UE, a first sidelink transmission comprising an indication of a first set of resources allocated for the first PRS, a second set of resources allocated for the second PRS, or both.

Aspect 13: The method of aspect 12, further comprising: transmitting, to a third UE, a second sidelink transmission comprising an indication of a third set of resources allocated for a third PRS, a fourth set of resources allocated for a fourth PRS, or both.

Aspect 14: The method of aspect 13, further comprising: receiving the third PRS from the third UE using the set of receive antennas in response to the second sidelink transmission; transmitting the fourth PRS to the third UE using the set of transmit antennas in response to the received third PRS; and receiving, from the third UE, an additional control message indicating time and position information for the third PRS transmitted by the third UE, and time and position information for the fourth PRS received at the third UE, wherein determining the position of the first UE is based at least in part on the additional control message received from the third UE.

Aspect 15: The method of any of aspects 1 through 14, further comprising: estimating a clock calibration error associated with the set of receive antennas, the set of transmit antennas, or both, based on the control message received from the second UE, wherein determining the position of the first UE is based at least in part on the estimated clock calibration error.

Aspect 16: The method of any of aspects 1 through 15, wherein the control message received from the second UE comprises an intelligent transportation system message.

Aspect 17: The method of any of aspects 1 through 16, wherein the first PRS, the second PRS, or both, are transmitted via an unlicensed radio frequency spectrum band, and the control message is transmitted via a licensed radio frequency spectrum band.

Aspect 18: The method of any of aspects 1 through 17, wherein the first PRS, the second PRS, the control message, or a combination thereof, is transmitted via a sidelink communication link between the first UE and the second UE.

Aspect 19: The method of any of aspects 1 through 18, wherein the first UE comprises a first vehicle, and the second UE comprises a second vehicle or a roadside unit.

Aspect 20: A method for wireless communication at a second UE, comprising: transmitting, using a set of transmit antennas, a first PRS; receiving, using a set of receive antennas in response to the transmitted first PRS, a second PRS, the set of transmit antennas, the set of receive antennas, or both, comprising a plurality of antennas; and transmitting, to a first UE, a control message indicating composite time and position information for the first PRS transmitted using the set of transmit antennas and for the second PRS received using the set of receive antennas.

Aspect 21: The method of aspect 20, further comprising: determining a composite reception time and a composite reception position associated with receiving the second PRS across the set of receive antennas, wherein the composite time and position information is based at least in part on the composite reception time and the composite reception position.

Aspect 22: The method of aspect 21, wherein determining the composite reception time and the composite reception position associated with receiving the second PRS across the set of receive antennas comprises: determining, for each receive antenna of the set of receive antennas, a time at which the second PRS was received at the receive antenna and a position of the receive antenna; determining an average time, a weighted average time, or an arithmetic mean time for the second PRS; and determining an average position, a weighted average position, or an arithmetic mean position for the set of receive antennas associated with the second PRS.

Aspect 23: The method of any of aspects 21 through 22, wherein the set of receive antennas comprises one receive antenna.

Aspect 24: The method of any of aspects 21 through 23, wherein the set of receive antennas comprises a plurality of receive antennas.

Aspect 25: The method of any of aspects 20 through 24, further comprising: determining a composite transmission time and a composite transmission position associated with transmitting the first PRS across the set of transmit antennas, wherein the composite time and position information is based at least in part on the composite transmission time and the composite transmission position.

Aspect 26: The method of aspect 25, wherein determining the composite transmission time and the composite transmission position associated with transmitting the first PRS across the set of transmit antennas comprises: determining a set of transmission times indicating a time at which the first PRS was transmitted by each transmit antenna of the set of transmit antennas; determining an average time, a weighted average time, or an arithmetic mean time for the first PRS; and determining an average position, a weighted average position, or an arithmetic mean position for the set of transmit antennas associated with the first PRS.

Aspect 27: The method of any of aspects 25 through 26, wherein the set of transmit antennas comprises one transmit antenna.

Aspect 28: The method of any of aspects 25 through 27, wherein the set of transmit antennas comprises a plurality of transmit antennas.

Aspect 29: The method of any of aspects 20 through 28, further comprising: transmitting, via the control message, an indication of a position of the second UE.

Aspect 30: The method of any of aspects 20 through 29, further comprising: receiving, from the first UE, a first sidelink transmission comprising an indication of a first set of resources allocated for the first PRS, a second set of resources allocated for the second PRS, or both.

Aspect 31: The method of any of aspects 20 through 30, wherein the control message transmitted to the first UE comprises an intelligent transportation system message.

Aspect 32: The method of any of aspects 20 through 31, wherein the first PRS, the second PRS, or both, are transmitted via an unlicensed radio frequency spectrum band, and the control message is transmitted via a licensed radio frequency spectrum band.

Aspect 33: The method of any of aspects 20 through 32, wherein the first PRS, the second PRS, the control message, or a combination thereof, is transmitted via a sidelink communication link between the first UE and the second UE.

Aspect 34: The method of any of aspects 20 through 33, wherein the first UE comprises a first vehicle, and the second UE comprises a second vehicle or a roadside unit.

Aspect 35: An apparatus for wireless communication at a first UE, comprising a processor; memory coupled with the processor; and instructions stored in the memory and executable by the processor to cause the apparatus to perform a method of any of aspects 1 through 19.

Aspect 36: An apparatus for wireless communication at a first UE, comprising at least one means for performing a method of any of aspects 1 through 19.

Aspect 37: A non-transitory computer-readable medium storing code for wireless communication at a first UE, the code comprising instructions executable by a processor to perform a method of any of aspects 1 through 19.

Aspect 38: An apparatus for wireless communication at a second UE, comprising a processor; memory coupled with the processor; and instructions stored in the memory and executable by the processor to cause the apparatus to perform a method of any of aspects 20 through 34.

Aspect 39: An apparatus for wireless communication at a second UE, comprising at least one means for performing a method of any of aspects 20 through 34.

Aspect 40: A non-transitory computer-readable medium storing code for wireless communication at a second UE, the code comprising instructions executable by a processor to perform a method of any of aspects 20 through 34.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a first user equipment (UE), comprising:
   one or more transceivers;
   one or more memory; and
   one or more processors electronically coupled to the one or more memory and the one or more transceivers, the one or more processors configured to:
      receive, using a set of receive antennas, a first positioning reference signal;
      transmit, using a set of transmit antennas in response to the received first positioning reference signal, a second positioning reference signal, the set of transmit antennas or the set of receive antennas, or both, comprising a plurality of antennas;
      receive, from a second UE, a control message indicating time and position information for the first positioning reference signal transmitted by the second UE and for the second positioning reference signal received at the second UE; and
      determine a position of the first UE based at least in part on the received control message and composite time and position information for the first positioning reference signal received at the first UE and for the second positioning reference signal transmitted by the first UE.

2. The apparatus of claim 1, wherein the one or more processors are further configured to:
   determine a composite reception time and a composite reception position associated with receiving the first positioning reference signal across the set of receive antennas, wherein the composite time and position information is based at least in part on the composite reception time and the composite reception position.

3. The apparatus of claim 2, wherein to determine the composite reception time and the composite reception position associated with receiving the first positioning reference signal across the set of receive antennas, the one or more processors are configured to:
   determine, for each receive antenna of the set of receive antennas, a time at which the first positioning reference signal was received at the receive antenna and a position of the receive antenna;
   determine an average time, a weighted average time, or an arithmetic mean time for the first positioning reference signal; and
   determine an average position, a weighted average position, or an arithmetic mean position for the set of receive antennas associated with the first positioning reference signal.

4. The apparatus of claim 1, wherein to the one or more processors are further configured to:
   determine a composite transmission time and a composite transmission position associated with transmitting the second positioning reference signal across the set of transmit antennas, wherein the composite time and position information is based at least in part on the composite transmission time and the composite transmission position.

5. The apparatus of claim 4, wherein to determine the composite transmission time and the composite transmission position associated with transmitting the second positioning reference signal across the set of transmit antennas, the one or more processors are configured to:
   determine a set of transmission times indicating a time at which the second positioning reference signal was transmitted by each transmit antenna of the set of transmit antennas;
   determine an average time, a weighted average time, or an arithmetic mean time for the second positioning reference signal; and determine an average position, a weighted average position, or an arithmetic mean position for the set of transmit antennas associated with the second positioning reference signal.

6. The apparatus of claim 1, wherein the one or more processors are further configured to:
receive, via the control message, an indication of a position of the second UE, wherein determining the position of the first UE is based at least in part on the indication of the position of the second UE.

7. The apparatus of claim 6, wherein the one or more processors are further configured to:
determine a first propagation time associated with the first positioning reference signal, a second propagation time associated with the second positioning reference signal, or both, based at least in part on the received control message and the composite time and position information for the first positioning reference signal received at the first UE and for the second positioning reference signal transmitted by the first UE; and
determine the position of the of the first UE based at least in part on the position of the second UE, the first propagation time, the second propagation time, or any combination thereof.

8. The apparatus of claim 1, wherein the one or more processors are further configured to:
transmit, to the second UE, a first sidelink transmission comprising an indication of a first set of resources allocated for the first positioning reference signal, a second set of resources allocated for the second positioning reference signal, or both.

9. The apparatus of claim 8, wherein the one or more processors are further configured to:
transmit, to a third UE, a second sidelink transmission comprising an indication of a third set of resources allocated for a third positioning reference signal, a fourth set of resources allocated for a fourth positioning reference signal, or both.

10. The apparatus of claim 1, wherein the one or more processors are further configured to:
estimate a clock calibration error associated with the set of receive antennas, the set of transmit antennas, or both, based on the control message received from the second UE, wherein determining the position of the first UE is based at least in part on the estimated clock calibration error.

11. The apparatus of claim 1, wherein the control message received from the second UE comprises an intelligent transportation system message.

12. The apparatus of claim 1, wherein the first positioning reference signal, the second positioning reference signal, or both, are transmitted via an unlicensed radio frequency spectrum band, and wherein the control message is transmitted via a licensed radio frequency spectrum band.

13. The apparatus of claim 1, wherein the first positioning reference signal, the second positioning reference signal, the control message, or a combination thereof, is transmitted via a sidelink communication link between the first UE and the second UE.

14. An apparatus for wireless communication at a second user equipment (UE), comprising:
one or more transceivers;
one or more memory; and
one or more processors electronically coupled to the one or more memory and the one or more transceivers, the one or more processors configured to:
transmit, using a set of transmit antennas, a first positioning reference signal;
receive, using a set of receive antennas in response to the transmitted first positioning reference signal, a second positioning reference signal, the set of transmit antennas, the set of receive antennas, or both, comprising a plurality of antennas; and
transmit, to a first UE, a control message indicating composite time and position information for the first positioning reference signal transmitted using the set of transmit antennas and for the second positioning reference signal received using the set of receive antennas.

15. The apparatus of claim 14, wherein the one or more processors are further configured to:
determine a composite reception time and a composite reception position associated with receiving the second positioning reference signal across the set of receive antennas, wherein the composite time and position information is based at least in part on the composite reception time and the composite reception position.

16. The apparatus of claim 15, wherein to determine the composite reception time and the composite reception position associated with receiving the second positioning reference signal across the set of receive antennas, the one or more processors are configured to:
determine, for each receive antenna of the set of receive antennas, a time at which the second positioning reference signal was received at the receive antenna and a position of the receive antenna;
determine an average time, a weighted average time, or an arithmetic mean time for the second positioning reference signal; and
determine an average position, a weighted average position, or an arithmetic mean position for the set of receive antennas associated with the second positioning reference signal.

17. The apparatus of claim 14, wherein the one or more processors are further configured to:
determine a composite transmission time and a composite transmission position associated with transmitting the first positioning reference signal across the set of transmit antennas, wherein the composite time and position information is based at least in part on the composite transmission time and the composite transmission position.

18. The apparatus of claim 17, wherein to determine the composite transmission time and the composite transmission position associated with transmitting the first positioning reference signal across the set of transmit antennas, the one or more processors are configured to:
determine a set of transmission times indicating a time at which the first positioning reference signal was transmitted by each transmit antenna of the set of transmit antennas;
determine an average time, a weighted average time, or an arithmetic mean time for the first positioning reference signal; and
determine an average position, a weighted average position, or an arithmetic mean position for the set of transmit antennas associated with the first positioning reference signal.

19. The apparatus of claim 14, wherein the one or more processors are further configured to:
transmit, via the control message, an indication of a position of the second UE.

20. The apparatus of claim 14, wherein the one or more processors are further configured to:
receive, from the first UE, a first sidelink transmission comprising an indication of a first set of resources allocated for the first positioning reference signal, a second set of resources allocated for the second positioning reference signal, or both.

21. The apparatus of claim 14, wherein the control message transmitted to the first UE comprises an intelligent transportation system message.

22. The apparatus of claim 14, wherein the first positioning reference signal, the second positioning reference signal, or both, are transmitted via an unlicensed radio frequency spectrum band, and wherein the control message is transmitted via a licensed radio frequency spectrum band.

23. The apparatus of claim 14, wherein the first positioning reference signal, the second positioning reference signal, the control message, or a combination thereof, is transmitted via a sidelink communication link between the first UE and the second UE.

24. A method for wireless communication at a first user equipment (UE), comprising:
receiving, using a set of receive antennas, a first positioning reference signal;
transmitting, using a set of transmit antennas in response to the received first positioning reference signal, a second positioning reference signal, the set of transmit antennas or the set of receive antennas, or both, comprising a plurality of antennas;
receiving, from a second UE, a control message indicating time and position information for the first positioning reference signal transmitted by the second UE and for the second positioning reference signal received at the second UE; and
determining a position of the first UE based at least in part on the received control message and composite time and position information for the first positioning reference signal received at the first UE and for the second positioning reference signal transmitted by the first UE.

25. The method of claim 24, further comprising:
determining a composite reception time and a composite reception position associated with receiving the first positioning reference signal across the set of receive antennas, wherein the composite time and position information is based at least in part on the composite reception time and the composite reception position.

26. The method of claim 25, wherein determining the composite reception time and the composite reception position associated with receiving the first positioning reference signal across the set of receive antennas comprises:
determining, for each receive antenna of the set of receive antennas, a time at which the first positioning reference signal was received at the receive antenna and a position of the receive antenna;
determining an average time, a weighted average time, or an arithmetic mean time for the first positioning reference signal; and
determining an average position, a weighted average position, or an arithmetic mean position for the set of receive antennas associated with the first positioning reference signal.

27. The method of claim 24, further comprising:
determining a composite transmission time and a composite transmission position associated with transmitting the second positioning reference signal across the set of transmit antennas, wherein the composite time and position information is based at least in part on the composite transmission time and the composite transmission position.

28. The method of claim 24, further comprising:
receiving, via the control message, an indication of a position of the second UE, wherein determining the position of the first UE is based at least in part on the indication of the position of the second UE.

29. The method of claim 24, further comprising:
transmitting, to the second UE, a first sidelink transmission comprising an indication of a first set of resources allocated for the first positioning reference signal, a second set of resources allocated for the second positioning reference signal, or both.

30. A method for wireless communication at a second user equipment (UE), comprising:
transmitting, using a set of transmit antennas, a first positioning reference signal;
receiving, using a set of receive antennas in response to the transmitted first positioning reference signal, a second positioning reference signal, the set of transmit antennas, the set of receive antennas, or both, comprising a plurality of antennas; and
transmitting, to a first UE, a control message indicating composite time and position information for the first positioning reference signal transmitted using the set of transmit antennas and for the second positioning reference signal received using the set of receive antennas.

* * * * *